(12) United States Patent
Abrant et al.

(10) Patent No.: US 7,913,284 B2
(45) Date of Patent: Mar. 22, 2011

(54) METHOD AND APPARATUS FOR CAPTURING MOBILE MULTIMEDIA SIGNALS

(75) Inventors: Robert Abrant, Downers Grove, IL (US); Mark Bapst, South Barrington, IL (US); Satyajit Patne, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1208 days.

(21) Appl. No.: 11/468,982

(22) Filed: Aug. 31, 2006

(65) Prior Publication Data
US 2008/0057918 A1 Mar. 6, 2008

(51) Int. Cl.
*H04N 7/173* (2006.01)
(52) U.S. Cl. .................... 725/116; 725/62; 455/3.06
(58) Field of Classification Search .................. None
See application file for complete search history.

(56) References Cited

U.S. PATENT DOCUMENTS

| | | | |
|---|---|---|---|
| 5,928,331 A * | 7/1999 | Bushmitch | 709/231 |
| 6,519,011 B1 | 2/2003 | Shendar | |
| 6,704,576 B1 * | 3/2004 | Brachman et al. | 455/503 |
| 7,466,367 B2 * | 12/2008 | DaCosta | 348/730 |
| 7,643,807 B2 * | 1/2010 | Gupta et al. | 455/179.1 |
| 2003/0145327 A1 * | 7/2003 | Baldwin et al. | 725/49 |
| 2003/0193619 A1 | 10/2003 | Farrand | |
| 2004/0003399 A1 | 1/2004 | Cooper | |
| 2005/0166245 A1 * | 7/2005 | Shin et al. | 725/104 |
| 2005/0273833 A1 * | 12/2005 | Soinio | 725/113 |
| 2006/0034321 A1 * | 2/2006 | Paila et al. | 370/464 |
| 2006/0104237 A1 * | 5/2006 | Ryu | 370/328 |
| 2006/0234624 A1 * | 10/2006 | Yeh | 455/3.02 |
| 2007/0067815 A1 * | 3/2007 | Bowen et al. | 725/99 |
| 2007/0097272 A1 * | 5/2007 | Moradi et al. | 348/731 |
| 2007/0101388 A1 | 5/2007 | Scheid | |
| 2008/0194217 A1 * | 8/2008 | Eubanks | 455/186.1 |

OTHER PUBLICATIONS

"DVB-H306 v.1.2, Extension to the DVB-H Implementation Guidelines on Dynamic Zapping Service."

* cited by examiner

*Primary Examiner* — Andrew Y Koenig
*Assistant Examiner* — Jason Chung
(74) *Attorney, Agent, or Firm* — John Rickenbrode

(57) ABSTRACT

A current mobile multimedia signal time slice is captured using a mobile MM receiver in response to a current mobile multimedia stream-identifying command input. The current mobile multimedia signal time slice contains at least one portion of a currently selected mobile multimedia stream. At least one anticipated mobile multimedia time slice is selectively captured. The at least one anticipated mobile multimedia time slice contains at least one portion of a corresponding anticipated mobile multimedia stream.

54 Claims, 13 Drawing Sheets

METHOD AND APPARATUS FOR CAPTURING MOBILE MULTIMEDIA SIGNALS

FIELD OF THE INVENTION

The invention generally relates to the receipt of mobile multimedia signals and, more particularly, to the selective capture of mobile multimedia signals by a computing device having a mobile multimedia receiver.

BACKGROUND OF THE INVENTION

Mobile devices such as mobile phones, personal digital assistants ("PDAs"), portable audio and/or video players and other handheld devices have transformed the modern world by providing many practical mobile services to users wherever they may travel. One such mobile service is the reception of mobile multimedia ("MM") content. Because of the portable nature of mobile devices, mobile MM content is generally broadcast to users over the air using mobile MM signals. One of the most common types of MM content carried by the mobile MM signals is digital television content. However, it is recognized that any type of digital content may be carried by mobile MM signals.

Accordingly, a variety of standards has emerged and continues to evolve with regard to the transmission of and receipt of mobile MM signals. One such standard is the Digital Video Broadcasting-Handheld ("DVB-H") standard. One having ordinary skill in the art will recognize that the DVB-H standard is one standard of several standards associated with the Digital Video Broadcasting suite of standards that also govern, among other things, the transmission and receipt of terrestrial and satellite signals. Other mobile MM signal standards include, but are not limited to, MediaFLO by Qualcomm, Digital Multimedia Broadcasting ("DMB") and Terrestrial Integrated Services Digital Broadcasting (ISDB-T).

As recognized, mobile MM signals consist of one or more MM streams that are compressed, time division multiplexed, modulated and broadcast at a predetermined frequency. Generally, each service provider is allocated one or more frequencies through which it may broadcast mobile MM content. Because each mobile MM stream is time division multiplexed, the content from each stream appears in a given mobile MM signal at periodic intervals. Each appearance may be termed a burst. To capture a given burst of a desired mobile MM stream, a mobile MM receiver uses its mobile MM tuner to selectively tune into a desired frequency along which the mobile MM signal is broadcast and to selectively listen and capture a specific time slice of the broadcast mobile MM signal. Other bursts from one or more additional mobile MM streams, however, may also be captured based on the size of the time slice. It is recognized that the longer the time slice, the more bursts form other additional mobile MM streams may be captured.

After capture, the mobile MM content from the time slice is demodulated by the MM receiver. The demodulated mobile MM content from the time slice includes one or more IP datagrams. After demodulation, the IP datagrams corresponding to the desired mobile MM stream are stored in memory prior to display. If display is desired in real time, the storage may be temporary and used for timing purposes. The other IP datagrams corresponding to other captured bursts from other additional mobile MM streams are discarded. IP datagram are distinguished, as known in the art, by IP address information contained in the header of each IP datagram.

Those having ordinary skill in the art will recognize that because the demodulated multimedia content is in the form of IP datagrams, any type of digital content may be broadcast as IP packets (i.e., the same format used to transfer data over the Internet). For example, video streams, web pages, music files, and games are just some examples of digital content that may be broadcast using mobile MM signals.

After a given capture, one or more components of the mobile MM receiver are selectively placed into a low power state to conserve power on the mobile device until the next burst is broadcast and available. Just prior to the next burst, the mobile MM receiver is selectively turned on and provided information as to when to capture the next time slice containing mobile MM content associated with the desired mobile MM stream.

During an initial capture of a mobile MM stream, for example, a user initially powers up a mobile device and then selects a given mobile MM stream by inputting a current mobile MM stream command input. The mobile MM receiver and tuner may be selectively controlled using frequency information and timing information stored on the mobile device. In one embodiment, the mobile device may be preprogrammed to listen to a predetermined frequency corresponding to the service to which a user subscribes while timing information is obtained from an initial capture (e.g., as part of Electronic Service Guide ("ESG") data broadcast in the mobile MM signal). In another embodiment, the mobile device may be preprogrammed to contain both predetermined frequency and timing information. Other suitable techniques are also recognized. To capture subsequent bursts, the mobile MM receiver is selectively turned on just prior to the burst being available by keeping track of slice time information contained in a previous burst where the slice time information represents an amount of time before a subsequent burst of the same mobile MM stream.

After a user selects a mobile MM stream, the process of placing one or more components of the mobile MM receiver in a low power state and turning it back on prior to capture of a subsequent burst is transparent to the user. However, when a user desires to select a different mobile MM stream (e.g., when a user changes channels of digital TV), an undesirable zapping delay is experienced. The zapping time corresponds to the amount of time necessary for at least one of: (i) the mobile device to determine the frequency and time slice information of the newly selected mobile MM stream, (ii) the mobile MM receiver (e.g., tuner) to wait until the time slice is available on the mobile MM signal and to subsequently acquire or capture the time slice, (iii) the mobile MM receiver (e.g., demodulator) to demodulate the captured time slice, (iv) a controller to identify the IP datagrams corresponding to the proper burst (while discarding other IP datagrams), (v) the mobile MM receiver, controller or decoder to perform any error correction, (vi) the decoder to decode the burst, and (vii) the display of the burst representing at least a portion of the newly selected mobile MM stream. Due to the period and length of each time slice and burst and further due to the layers of complexity involved in error correction and identifying the appropriate IP datagrams, the combined zapping delay can be on the order of 5-7 seconds depending on the service provider network configuration and the design of the mobile device.

As recognized, the zapping delay results in an undesirable user experience in a mobile MM environment. Accordingly, a need exists for reducing the zapping delay and making a user's experiences in mobile MM environments more desirable. A further need exists to keep the overall power consumption of the mobile device to a minimum while providing the desirable mobile MM environment.

BRIEF DESCRIPTION OF THE DRAWINGS

The invention will be more readily understood in view of the following description when accompanied by the below figures and wherein like reference numerals represent like elements.

DETAILED DESCRIPTION

Figure 1:
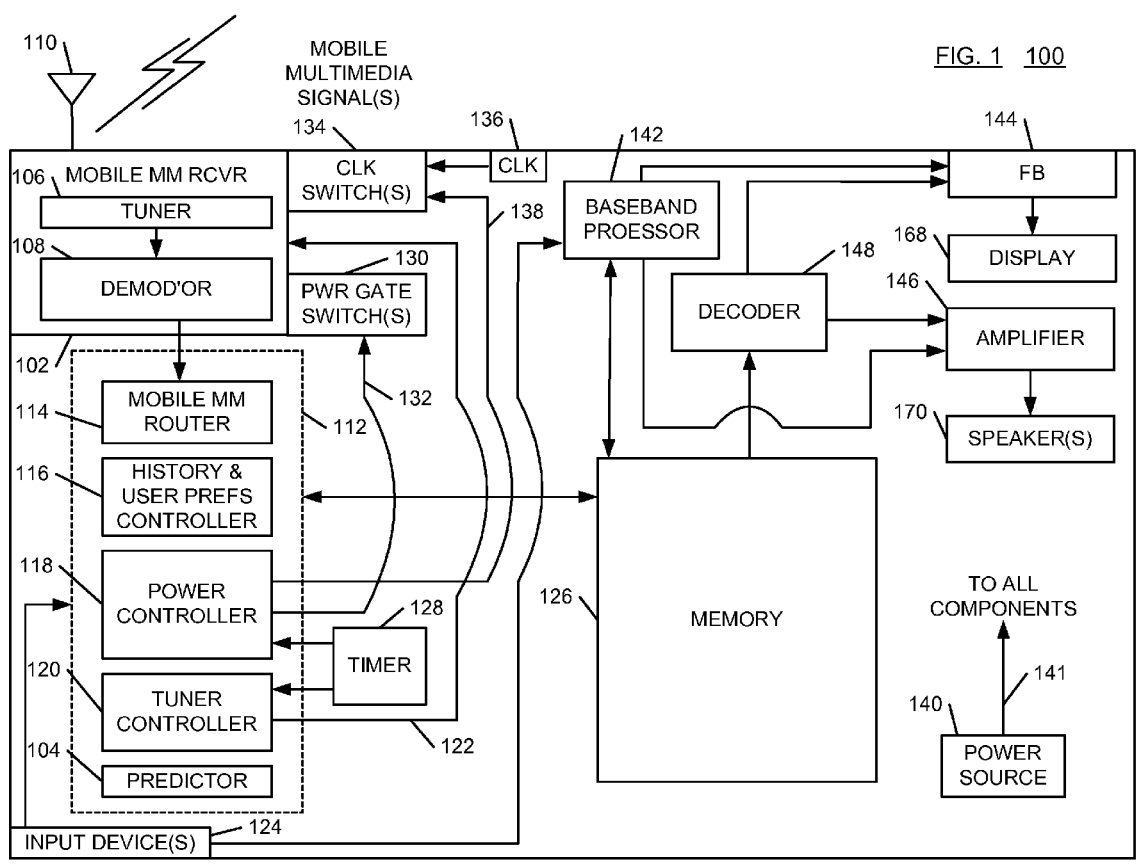
FIG. 1 is a block diagram illustrating one example of a computing device including a mobile multimedia receiver and, among other things, a predictor in accordance with one embodiment of the present disclosure.

Generally, the present description provides a method and apparatus for capturing mobile multimedia ("MM") signals using, for example, a mobile MM receiver to capture a current mobile MM signal time slice that contains at least one portion of a currently selected mobile MM stream. As recognized, a mobile MM signal may include mobile MM content from multiple mobile MM streams that are, among other things, time division multiplexed. Thereafter, at least one mobile MM signal time slice containing at least one portion of a corresponding anticipated mobile MM stream is captured.

In one embodiment, the method and apparatus further includes identifying one or more anticipated mobile MM streams, prior to selectively capturing the at least one anticipated mobile MM time slice, based on: current user input, historical information, real time clock information, user preference information, default information or any other suitable information. In one embodiment, the identification of one or more anticipated mobile MM streams is performed using a predictor. By identifying the one or more anticipated mobile MM streams, the method and apparatus is attempting to predict the behavior of a user. In one embodiment, the identification of the one or more anticipated mobile MM signals includes prioritizing each identified signal using prioritization information and selectively capturing the at least one anticipated mobile signal time slice based on this prioritization.

In another embodiment, the method and apparatus may include selectively placing one or more components of the mobile MM receiver in a low power state when not performing a mobile MM signal time slice capture or demodulation. In one embodiment, a power controller may be responsive to generate power control information and selectively control an amount of voltage supplied to one or more components of the mobile MM receiver. In another embodiment, the power controller may be responsive to generated clock control information and selectively control a clock signal supplied to the one or more components of the mobile MM receiver.

In one embodiment, a demodulator is used to demodulate the captured time slices. Because each time slice may contain mobile MM content associated with other streams than those desired (i.e., those selected by a user or anticipated by the predictor), the method and apparatus may include a mobile MM router that identifies such unwanted mobile MM content and discards the unwanted IP datagrams. The desired IP datagrams are stored in memory. In one embodiment, the mobile MM router only routes and stores a final segment of the anticipated mobile MM stream represented in the corresponding demodulated anticipated mobile MM signal time slice. The size of the final segment may vary based on the available processing speed of the decoder, the available processing capability of the decoder and/or the available memory.

In one embodiment, a decoder is used to decode one or more of the demodulated time slices. When the predictor accurately predicts the behavior of the user, at least one portion of a previously demodulated anticipated time slice corresponding to a previous (in time) burst of the currently selected mobile MM stream is already stored in memory. If already stored in memory, the decoder decodes this at least one portion of the previously decoded anticipated time slice prior to decoding the at least one portion of the demodulated current time slice such that the at least one portion of the previously demodulated anticipated time slice is reproduced immediately before the at least one portion of the demodulated current time slice. If the at least one portion of the previously decoded anticipated time slice represents a final segment of the previously anticipated mobile MM stream represented in previously demodulated anticipated time slice, continuity or a seamless transition between the reproduction of the time slices may be obtained. Similarly, the decoder may alter the frame rate and/or bit rate of the previously demodulated anticipated time slice to better provide a continuous or seamless transition.

Accordingly, the method and apparatus discussed herein reduces the zapping delay by predicting, capturing and demodulating at least one or more anticipated mobile MM stream. If the prediction is accurate, a previously demodulated anticipated time slice corresponding to the currently selected mobile MM stream may be quickly retrieved from memory, decoded and reproduced while a current mobile MM time slice is captured and demodulated based on user input. Thus, the at least one portion of the previously demodulated anticipated mobile MM time slice is displayed during the traditional zapping delay period. By storing only final segments of the anticipated mobile MM signal streams contained in each of the captured anticipated time slices and/or by further adjusting the frame rate and/or bit rate of the MM content, the transition from the reproduction of the at least one portion of the previously demodulated anticipated time slice to the reproduction of the at least one portion of the currently captured time slice may appear seamless to the user.

The present disclosure can be more fully described with reference to FIGS. 1-14. In the following detailed description, numerous specific details are set forth in order to provide a thorough understanding of the present disclosure. It will be apparent to one of ordinary skill in the art, however, that these specific details need not be used to practice the present embodiments of the disclosure. In other instances, well-known structures, interfaces, and processes have not been shown or have not been shown in detail in order not to unnecessarily obscure the present disclosure.

FIG. 1 is a block diagram illustrating one example of a computing device 100 including a mobile MM receiver 102 and, among other things, a predictor 104 in accordance with one embodiment of the present disclosure. Although computing device 100 is illustrated as a stand-alone mobile device or computer system, it is not intended to be so limiting and may include non-mobile (e.g., alternating current-driven) devices or systems. The inventors recognize that computing device 100 may be a stand-alone mobile device or non-mobile computer system such as a mobile phone or a laptop computer system. The inventors further recognize that a computing device such as computing device 100 may also be any device capable of computation. For example, computing device 100 may also be one or more integrated circuits, integrated circuit packages, one or more discrete electronic components or any combination thereof. Computing device 100 may be fabricated on one or more die, chips, packages or printed circuit boards ("PCBs").

Mobile MM receiver 102 is any suitable device, circuit, component or combination thereof that is capable of capturing mobile MM signals using, such as DVB-H signals, and is further capable of demodulating the captured mobile MM signals. As recognized, the capture of the mobile MM signals is facilitated by antenna 110. As illustrated the mobile MM receiver 102 includes a tuner 106 and a demodulator 108 that perform the mobile MM signal capture and the mobile MM signal demodulation, respectively. In one embodiment, the mobile MM receiver 102 and its components (e.g., tuner 106 and demodulator 108) may be implemented using any number or combination of integrated circuits, application specific integrated circuits ("ASICs"), integrated circuit packages, discrete electronic components, etc. and may further include one or more processors, microprocessors, digital signal processors ("DSPs"), etc.

In a preferred embodiment, the mobile MM receiver 102 is coupled to a controller 112 which includes, a mobile MM router 114, a history and user preferences controller 116, a power controller 118, a tuner controller 120 and predictor 104. Each of the controller 112 components will be described below in more detail. However, it is recognized that controller 112 components may be implemented using any number or combination of integrated circuits, ASICs, integrated circuit packages, discrete electronic components, etc. and may further include one or more processors, microprocessors, and DSPs, etc. In one embodiment, one or more components of the controller 112 are fabricated or otherwise included on the same or different die, chip, package or PCB as one or more components of the mobile MM receiver 102.

In one embodiment, computing device 100 includes one or more input devices 124 that is coupled to one or more components of controller 112 and to a baseband processor 142. The one or more input devices 124 may include any suitable input device such as, but not limited to, a keyboard, a mouse, and a touchpad. The one or more input devices 124, in another embodiment, may be one or more input device ports or interfaces that receives input commands from one or more external input devices such as, but not limited to, a keyboard, a mouse and a touchpad. The port or interface may be implemented using any suitable port or interface such as, for example, a USB, FireWire, serial, parallel or other similar port. Hereinafter, the term one or more input devices 124 includes both the devices and/or the one or more input device ports or interfaces.

Figure 13:
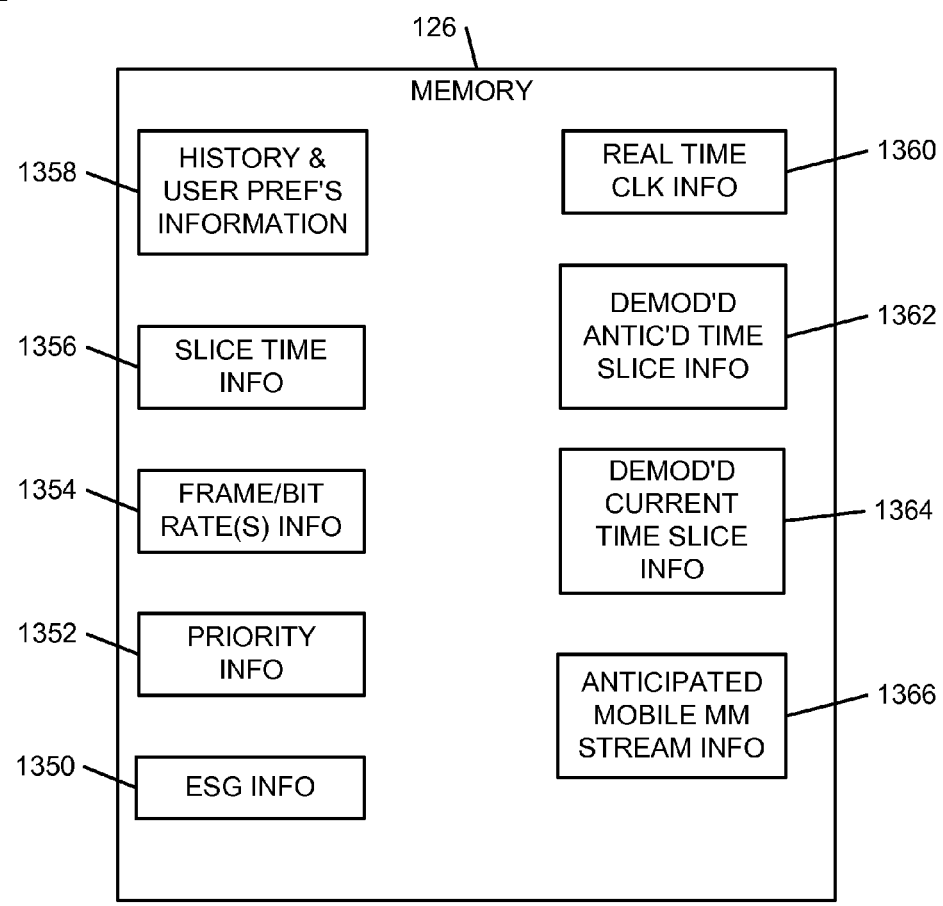
FIG. 13 illustrates a block diagram of the at least one memory of FIG. 1 in accordance with one embodiment of the present disclosure.

In one embodiment, computing device 100 includes at least one memory 126 that is capable of storing a variety of information. As illustrated in FIG. 13, the at least one memory 126 is segmented for purposes of illustration to show the types of information the at least one memory may store. For example, the at least one memory contains: ESG information segment 1350, priority information segment 1352, frame rate/bit rate information segment 1354, slice time information segment 1356, history and user preferences information segment 1358, real time clock information segment 1360, demodulated anticipated time slice information segment 1362, demodulated current time slice information segment 1364, and anticipated mobile MM stream information segment 1366. It is recognized, however, that the at least one memory 126 need not be organized in any particular manner and need not be segmented as described above.

The at least one memory 126 may further store additional information, data, algorithms, programs, etc. as necessary for computing device 100. For example, the at least one memory 126 may include executable instructions for any processors or microprocessors that comprise the mobile MM receiver 102 and controller 112. In one embodiment, the at least one memory 126 is any number of solid state storage or mass storage devices such as, but not limited to, any type of magnetic storage device, semiconductor device, optical storage device, magneto-optical storage device, etc. In one embodiment, the at least one memory 126 is implemented as RAM. In one embodiment, the at least one memory 126 resides on the same or different die, chip, package or PCB as one or more components of the: mobile MM receiver 102 and/or the controller 112. In another embodiment, the at least one memory 126 is accessible through any suitable I/O bus or network such as USB, Ethernet, SCSI, IDE, the internet, etc. and physically resides on an external or a remote device, terminal or server. In this embodiment, any suitable processor or controller (not specifically illustrated) may be used to access the at least one memory 126.

In one embodiment, the at least one memory 126 is coupled to the controller 112 such that information may be passed or transmitted between the at least one memory and any of the controller 112 components in any suitable fashion. In this manner, the at least one memory 126 may also serve as a buffer(s) or other temporary storage to allow direct communication between the controller 112 components.

One embodiment of computing device 100 further includes a timer 128 coupled to the power controller 118 and the tuner controller 120. Timer 128 may be any suitable component(s) or device(s) capable of serving as a reference to time. In one instance, timer 128 supplies a clock signal such that the power controller 118 and the tuner controller 120 are able to monitor the passage of time.

Computing device 100 may further include a power gate switch or switches 130 coupled to receive power control information 132 from the power controller 118. Although further discussed with reference to FIGS. 10-11, the power gate switch(es) 130 is coupled to one or more components of the mobile MM receiver 102 and selectively control the amount of voltage supplied to the one or more components of the mobile MM receiver 102 using the power control information 132 generated by the power controller 118. The voltage controlled by the power gate switch(es) 130 may be supplied by, for example, any suitable power source 140. In one embodiment the power source 140 is a rechargeable or single-use battery. In another embodiment, the power source 140 is supplied by a power distribution service such as, for example, a public or private electrical utility company.

As recognized, power control information 132 may be any suitable indicator such as a control signal, a control bit or bits, a control flag, etc. Similarly, the power gate switch(es) 130 may include any suitable electrical, electro-mechanical or any other suitable switching device or devices such as, but not limited to a MOS transistor or transistors where a gate terminal of the transistor(s) is coupled to receive the power control information 132 and thereby selectively controls the voltage level seen at each drain terminal.

Computing device 100 may further include a clock switch or switches 134 coupled to receive a clock 136 and clock control information 138 as generated by the power controller 118. Although further discussed with reference to FIG. 12, the clock switch(es) 134 is coupled to one or more components of the mobile MM receiver 102 and selectively control the clock signal supplied to the one or more components of the mobile MM receiver 102 based on the clock control information 138 generated by the power controller 118. As recognized clock control information 138 may be any suitable indicator such as a control signal, a control bit, a control flag, etc. Similarly, the clock switch(es) 134 may be any suitable electrical, electro-mechanical, or other suitable switching device or devices capable of controlling a clock signal such as, but not limited to a circuit performing the function of a logical AND gate that disables the clock signal based on clock control information 138. As recognized, the clock signal may be generated by clock 136 or any other suitable device or devices.

In one embodiment, one or more of: the one or more input device ports or interfaces 124, the timer 128, the power gate switch(es) 130, the clock switch(es) 134, and clock 136 are located on the same or different die, chip, package or PCB as one or more of components of the: mobile MM receiver 102, the controller 112 and/or the at least one memory 126.

In operation, a user identifies a given mobile MM stream using a mobile MM stream-identifying command input for identifying a broadcast mobile MM stream for reproduction. The selection is made via the one or more input devices 124. The mobile MM stream-identifying command input is then passed to a tuner controller 120 where the tuner controller 120 generates tuning information 122 based on the command input and further based on information maintained in the at least one memory 126, as known by those of ordinary skill in the art. In one embodiment, the information maintained in the at least one memory 126 that is used by the tuner controller 120 is maintained as part of ESG information segment 1350. As previously explained and in one embodiment, the information maintained in the at least one memory 126 (e.g., the ESG information segment 1350) may be preprogrammed by a service provider and/or obtained in a previous capture. Using tuning information 122, the mobile MM receiver 102, by its tuner 106, tunes into and captures a time slice of a given mobile MM signal using antenna 110.

The demodulator 108 receives the captured time slice of a given mobile MM signal and demodulates the time slice to generate demodulated time slices. As previously explained, the demodulated time slices are IP datagrams having header information that identifies which IP datagrams correspond to the desired burst (a portion of the mobile MM stream) present in the captured time slice. The IP datagrams are subsequently passed to the mobile MM router 114 using any suitable connection or link as known in the art. There, the mobile MM router 114 identifies the IP datagrams by its header information and discards those IP datagrams that do not correspond to the desired mobile MM stream. Mobile MM router 114 may receive the current mobile MM stream-identifying command input from the one or more input devices 124 and may use information stored in the at least one memory 126 (e.g., as part of ESG information segment 1350) to discern which IP datagrams correspond to the selected mobile MM stream. Any other discerning mechanism may be used. Those IP datagrams (i.e., at least one portion of the demodulated time slice) which are not discarded are passed to the at least one memory 126 for storage therein. In other words, the mobile MM router 114 identifies at least one portion of the demodulated time slice that corresponds to the proper mobile MM stream and stores the at least one portion of the demodulated time slice in the at least one memory.

In addition to mobile MM content (i.e., audio and/or video), the IP datagrams may contain a variety of information regarding the service provider's network (from where the mobile MM signals originated), the timing of the mobile MM stream, and other information relating to the content of the selected mobile MM stream. This additional non-audio and video information is also stored in the at least one memory 126 in any suitable manner. For instance, the IP datagrams may include real time clock information that may be used to build a history of when given mobile MM streams were selected by the user (as explained below). The real time clock information might be stored in the real time clock information segment 1360. Similarly, the IP datagrams may include slice time information indicating when the next burst of a selected mobile MM stream will be available for the tuner 106 to capture. The slice time information may be stored in the slice time information segment 1356. The IP datagrams may also include frame rate or bit rate information pertaining to the speed by which frames or bits of multimedia content should or may be reproduced. The frame rate and/or bit rate information may be stored in the frame/bit rate(s) information segment 1354. Finally, the IP datagrams may also include updated information for an ESG. The ESG information may be stored in the ESG information segment 1350 for subsequent decoding as known in the art. The identified at least one portion of the demodulated time slice may be stored in one of a demodulated current time slice information segment 1364 or a demodulated anticipated time slice segment 1362 as described below.

Prior to selectively tuning into, capturing and demodulating the time slice of a given mobile MM signal, the tuner 106 and demodulator 108 must be in an on state. As previously mentioned, it is known to power down and power up the tuner 106 and/or demodulator 108 to save power. The powering up or powering down the of the tuner 106 and/or demodulator 108 may be controlled by the power controller 118 which generates power control information 132, clock control information 138 and and/or any other suitable command, indicator, flag or signal to control the voltage and/or clock (e.g., the power) supplied to one of the tuner 106 and/or demodulator 108. The power control information 132 and/or clock control information 138 may be generated based on user input from the one or more input devices 124 (using one or more mobile MM stream-identifying command inputs) when a user selects a current or new mobile MM stream. However, when a user continues to view or listen to a previously selected mobile MM stream, without entering a new command input, the tuner 106 and demodulator 108 must be selectively turned on without user input. In this case, the power control information 132 and/or clock control information 138 may be generated based on slice time information 1356 that indicates when a subsequent burst of the desired mobile MM stream will be available. The power controller 118 may also be programmed to compensate for the intrinsic delay associated with powering up the necessary components. Thus, the power controller 118 may issue the power control information 132 and/or clock control information 136 in advance of the time indicated by the slice time information. Using a guard band (e.g., incorporating an additional predetermined amount of time) ensures that the necessary components of the mobile MM receiver 102 are powered up when the next burst is available.

In one embodiment, the slice time information maintained in the slice time information segment 1356 corresponds to any suitable indicator referencing the amount of time or clock cycles until the next burst is available. The power controller 118 uses timer 128 to wait the required amount of time referenced by the slice time information (and the predetermined guard band).

After the tuner 106 and demodulator 108 are placed in a powered state (as opposed to a low power state), the tuner 106 is tuned to capture the appropriate time slice using tuning information 122 generated by the tuner controller 120. Similar to the power control information 132 and the clock control information 138, the tuner controller 120 relies on the time slice information stored in the slice time information segment 1356 to capture the next burst. Because the time slice information indicates when the burst will be available, the tuner controller 120 also uses timer 128 to wait the amount of time referenced by the slice time information before selectively capturing the desire time slice.

The history and user preferences controller 116 operates to create and store historical information and user preference information in historical and user references information segment 1358 based on user input and real time clock information. Thus, for example, the computing device 100 may be aware of the user's past viewing and listening behavior by way of the selections they made and when they made said selections. It is recognized that the history and user preferences controller 116 may create the historical information by directly using user input or by using the demodulated time slices corresponding to the selected mobile MM streams (which is based on the user input). The real time clock information used to create the historical information may be requested by the history and user preferences controller 116 may be the most real time clock information maintained in the real time clock information segment 1360 at the time the user made a selection on the one or more input devices 124 or may be the real time clock information captured in the time slice in response to the currently selected mobile MM stream.

Predictor 104 predicts or identifies one or more anticipated mobile MM streams the user might select based on at least one of a current user input, historical information, real time clock information, user preference information and default information or any other suitable information. As used herein, default information may be user preference information preprogrammed by a manufacturer or other suitable OEM, etc. and may be stored in the history and user preferences information segment 1358. Information identifying the one or more anticipated mobile MM streams is stored in the anticipated mobile MM stream information segment 1366. User input may be a current mobile MM stream-identifying command input or a navigational command input for controlling the reproduction of an ESG as explained below.

Based on the identified one or more anticipated mobile MM streams stored in the anticipated mobile MM stream information segment 1366, the tuner controller 120 and power controller 118 selectively power up one or more components of the mobile MM receiver 102. For at least one anticipated mobile MM streams identified in the anticipated mobile MM stream information segment 1366, the mobile MM receiver 102 selectively captures at least one anticipated mobile MM signal time slice containing at least one portion of the corresponding anticipated mobile MM stream. This occurs in the same manner described above with respect to a user selected mobile MM stream. To differentiate the cases, the time slice captured in the former case where a user selects a mobile MM stream is termed a "current mobile MM signal time slice that contains at least one portion of the currently selected mobile MM stream." In the latter case where at least one anticipated mobile MM stream is captured, tuner 106 generates "at least one anticipated mobile MM time slices containing at least one portion of the corresponding anticipated mobile MM stream."

After capture, demodulation and transfer to the mobile MM router 114 occurs in the same manner described above. The demodulated current mobile MM signal time slice is termed "a demodulated current time slice" while the demodulated anticipated mobile MM signal time slices are termed "demodulated anticipated time slices." Based on the header information, the appropriate IP datagrams (i.e., at least a portion of each time slice) are maintained and stored in the at least one memory 126. This is performed using the mobile MM router 114 which identifies at least one portion of the demodulated current time slice that corresponds to the currently selected mobile MM stream and stores the at least one portion of the demodulated current time slice in the demodulated current time slice information segment 1364 as described above. Similarly, the mobile MM router 114 identifies at least one portion of the at least one demodulated anticipated time slice that corresponds to the at least one anticipated mobile MM stream. Subsequently, the mobile MM router 114 stores the at least one portion of the at least one demodulated anticipated time slice in the demodulated anticipated time slice information segment 1362.

The audio and/or video information associated with the identified at least one portion of the demodulated current time slice is stored in the demodulated current time slice information segment 1364 while the audio and/or video information associated with the at least one portion of the at least one demodulated anticipated time slice is stored in the demodulated anticipated time slice information 1362. Other information in the IP datagrams may be stored in the appropriate memory segment as explained above. It is restated that although the written description makes continuous reference to the various memory segments, the at least one memory 126 need not be segmented in any particular way. The memory segment references are made for purposes of illustration and example only.

In one embodiment, predictor 104 not only identifies the one or more anticipated mobile MM streams but also prioritizes them based on prioritization information. In one embodiment the prioritization information corresponds to predetermined prioritization information stored in priority information segment 1352. In one embodiment, the prioritization information may not only correspond to predetermined information such as any suitable algorithm, but may also correspond to any suitable self-adapting algorithm that evolves to include prioritization information based on, among other things, past user behavior, as known in the art. In this embodiment, the tuner controller 120 generates tuning information 122 to control the tuner 106 to selectively capture at least one anticipated mobile MM signal time slice based on the prioritization of the anticipated mobile MM streams. In one embodiment, the tuner 106 uses the prioritization to determine the order in which it should capture the corresponding time slices.

The following scenarios are illustrative of the manner in which predictor 104 might identify the one or more anticipated mobile MM streams. Each scenario is labeled by a case name and is further described with reference to a trigger mechanism, an anticipated action of the user and the identified anticipated mobile MM stream(s) that the trigger mechanism implicates. The scenarios below are merely for exemplary purposes as other anticipated mobile MM streams may be triggered based on any other current user input, historical information, real time clock information, user preference information, default information, and/or any other suitable information.

| Case Name | Trigger Mechanism | Anticipated Action of User | Anticipated Mobile Stream(s) |
|---|---|---|---|
| Display ESG | The user activates ESG display mechanism to display the ESG. | The user desires to view the ESG to determine which mobile MM streams are currently being broadcast. | The mobile MM stream(s) containing ESG information. |
| Select mobile MM stream (or program) from ESG | The user is viewing the ESG. | The user will select a mobile MM stream from the ESG to view and/or listen to. | Option 1: Assign a high priority to the mobile MM streams visible to the user in the current ESG. Option 2: Assign a high priority to the mobile MM stream that the user's input device has temporarily selected (e.g., follow a cursor mechanism and dynamically assign a high priority to the current MM stream that is highlighted or that is other pointed to by the cursor mechanism). If used with Option 1, assign this mobile MM stream the highest priority. |
| View Program Details | The user selects a "view details" option related to a given mobile MM stream on an ESG. | The user will choose to view the mobile MM stream related for which they selected the "view details" option. | The mobile MM stream for which the user selected the "view details" option. |
| View Channel Up/Down | The user activates a channel up or down shortcut mechanism using an input device. | The user will view the next mobile MM stream either up or down in the numerical sequence determined by the service provider, programmed by the user, or otherwise defined. | The mobile MM streams adjacent to the currently selected mobile MM stream. Priorities may be dynamically assigned as the user continues to use a channel up or down shortcut mechanism. |
| View Previous Selection | The user activates a quickview shortcut mechanism using an input device while viewing a current mobile MM stream. | The user will return to the previously viewed mobile MM stream. | The previously viewed mobile MM stream. If the user returns to a previously viewed mobile MM stream, immediately anticipate that the user will desire to return to the mobile MM stream viewed when the quickview shortcut mechanism was activated. |
| View Start-up Default | User launches mobile MM stream service on the system | The user desires to view a default or previously determined start up mobile MM | The default or previously determined mobile MM stream or the mobile MM |

| Case Name | Trigger Mechanism | Anticipated Action of User | Anticipated Mobile Stream(s) |
|---|---|---|---|
| | | stream or the ESG. | stream containing current ESG information. |
| View Periodically Recurring Favorite mobile MM stream | User is currently using or launches mobile MM stream service on the system at a particular time (as identified by a real time clock). | Based on historical information, real time clock information, and/or user preference information, the user desires to view a periodically recurring mobile MM stream (e.g., a serial television show) that is currently being broadcast. | The periodically recurring mobile MM stream. |

Computing device 100 may also include a baseband processor 142 and decoder 148 coupled to the at least one memory 126, a frame buffer 144 and an amplifier 146. Each of the baseband processor 142 and the decoder 148 may be implemented using any number or combination of integrated circuits, ASICs, integrated circuit packages, discrete electronic components, etc. and may further include one or more processors, microprocessors, and DSPs, etc. As will be recognized, each of the baseband processor 142 and the decoder 148 may be part of the controller 112. In another embodiment, the baseband processor 142 and the decoder 148 are located on the same or different die, chip, package or PCB as one or more components of the: mobile MM receiver 102, the controller 112 or any other component previously described. It is recognized that the at least one memory 126 may contain executable instructions for execution by the baseband processor 142 and/or decoder 148.

Frame buffer 144 may be any suitable memory such as, but not limited to any number of solid state storage or mass storage devices such as, but not limited to, any type of magnetic storage device, semiconductor device, optical storage device, magneto-optical storage device, etc. In one embodiment, frame buffer 144 is implemented as cache to temporarily store frame data for display as known in the art. In another embodiment, the frame buffer 144 may be part of or associated with the at least one memory 126. Frame buffer 144 is coupled to display 168 where display 168 is any suitable display capable of visibly reproducing video and graphic information such as an LCD. Display 168 is at least coupled or integrated to the computing device 100. As illustrated, the display 168 is integrated with the computing system 100 as is generally found in mobile devices.

Amplifier 146 may be any suitable audio amplifier (and or related circuitry such as a DAC) for amplifying audio components of a MM signal prior to reproduction. In one embodiment, amplifier 146 may be implemented using any number or combination of integrated circuits, ASICs, integrated circuit packages, discrete electronic components, etc. Amplifier 146 is coupled to speaker(s) 170 where speaker(s) 170 is any suitable speaker(s) capable of audibly reproducing audio information. Speaker(s) 170 is at least coupled or integrated to the computing device 100. As illustrated, the speaker(s) is integrated with the computing device 100 as is generally found in mobile devices.

As illustrated and previously explained, baseband processor 142 is coupled to the one or more input devices 124. In one embodiment, the baseband processor 142 manages the ESG and thus is responsive to user inputs from the one or more input devices. The user inputs may correspond to a mobile MM stream-identifying command input and/or one or more navigational command inputs for controlling the reproduction of the ESG on at least one of the display 168 and speaker(s) 170. It is recognized that a mobile MM stream-identifying command input may have a navigational effect on the ESG and thus may also be considered a navigational command input. In one embodiment, the baseband processor 142 uses ESG information stored in the ESG information segment 1350 to manage the ESG. One having ordinary skill in the art will also recognize that the baseband processor 142 may have additional responsibilities within computing device 100.

Decoder 148 may use any suitable codec or codec such as but not limited to H.264 and AAC to decode the video and/or audio associated with the at least one portion of the demodulated current time slice allowing for the reproduction of the mobile MM content. Decoder 148 may, under certain circumstances decode the video and/or audio associated with the at least one portion of the at least one demodulated anticipated time slice as explained immediately below.

In response to a current mobile MM stream-identifying command input that identifies the currently selected mobile MM stream, the MM router 114 determines whether the at least one memory (e.g., the demodulated anticipated time slice information segment 1362) contains at least a portion of a previously demodulated time slice representing a previous (e.g., previous in time) portion of the currently selected mobile MM stream. That is, the mobile MM router 114 first checks to see if the predictor 104 accurately predicted the currently selected mobile MM stream and previously caused the demodulation of at least one portion of the currently selected mobile MM stream. If the predictor 104 accurately predicted or anticipated the currently selected mobile MM stream, the decoder 148 first decodes the at least one portion of the previously demodulated time slice while the mobile MM receiver 102 and mobile MM router 114 contemporaneously captures, demodulates and passes the current mobile MM signal time slice to the at least one memory. After decoding the at least one portion of the previously demodulated time slice, decoder 148 decodes the current mobile MM signal time slice so that the at least one portion of the previously demodulated time slice may be reproduced before the at least one portion of the current mobile MM signal time slice is reproduced.

When the predictor 104 accurately predicts the user's anticipated behavior, the zapping time or delay typically experienced by a user is greatly reduced and may, in one embodiment, be limited only by the minimum delay associated with decoding the at least one portion of the previously demodulated time slice. For example, the zapping delay may be reduced from 5-7 seconds to 2 seconds or less. As one having ordinary skill in the art will recognize, if the one or more anticipated mobile MM streams are located in the same time slice as the currently selected mobile MM stream additional time savings are accrued when compared to anticipated mobile MM streams located in different time slices than the currently selected mobile MM stream.

In one embodiment, the mobile MM router 119 passes to the at least one memory 126 (i.e., the demodulated anticipated time slice information segment 1364) only the final segment of the anticipated mobile MM stream represented in the at least one anticipated mobile MM signal time slice. This reduces or eliminates unwanted glitches such as discontinuities in the reproduction on the display 168 and/or speakers 170 that may otherwise result from the at least one portion of the previously demodulated time slice having a longer play time than the amount of time available before the at least one portion of the current mobile MM signal time slice is captured, demodulated, decoded and reproduced. This amount of time available may be determined based on the predetermined intrinsic delay and the time slice information maintained by the at least one memory 126 (e.g., in ESG information segment 1350 or in the slice time information 1356). To maintain the continuity and thereby avoid the unwanted glitches, the mobile MM router 114 may only pass a final segment of the anticipated mobile MM stream represented in the at least one anticipated mobile MM signal time slice. As recognized, the size of the final segment may be adjusted based on the amount of available memory, an available processing speed, and/or an available processing capacity of the decoder 148 (e.g., the number of MIPS the decoder 148 is capable of handling).

In another embodiment, decoder 148 may adjust the frame rate and/or bit rate associated with the at least one portion of the previously demodulated time slice to provide a seamless transition (e.g., to maintain continuity) from the reproduction of the at least one portion of the previously demodulated time slice to the reproduction of the at least one portion of the demodulated current time slice. As understood, the frame rate and/or bit rate(s) may be part of the demodulated anticipated time slice and may indicate the default frame and/or bit rate by which the underlying MM content should be reproduced. As indicated in FIG. 13, the frame rate and/or bit rate associated with the at least one portion of the previously demodulated time slice may be stored in the frame/bit rate(s) information segment 1354. The adjustment may be based on the amount of time available before the at least one portion of the demodulated current time slice is decoded and reproduced. By adjusting the frame and/or bit rate(s) the decoder 148 may insure that the transition from a previously generated demodulated time slice to a current demodulate time slice is continuous and seamless (e.g., transparent to the user).

Figure 2:
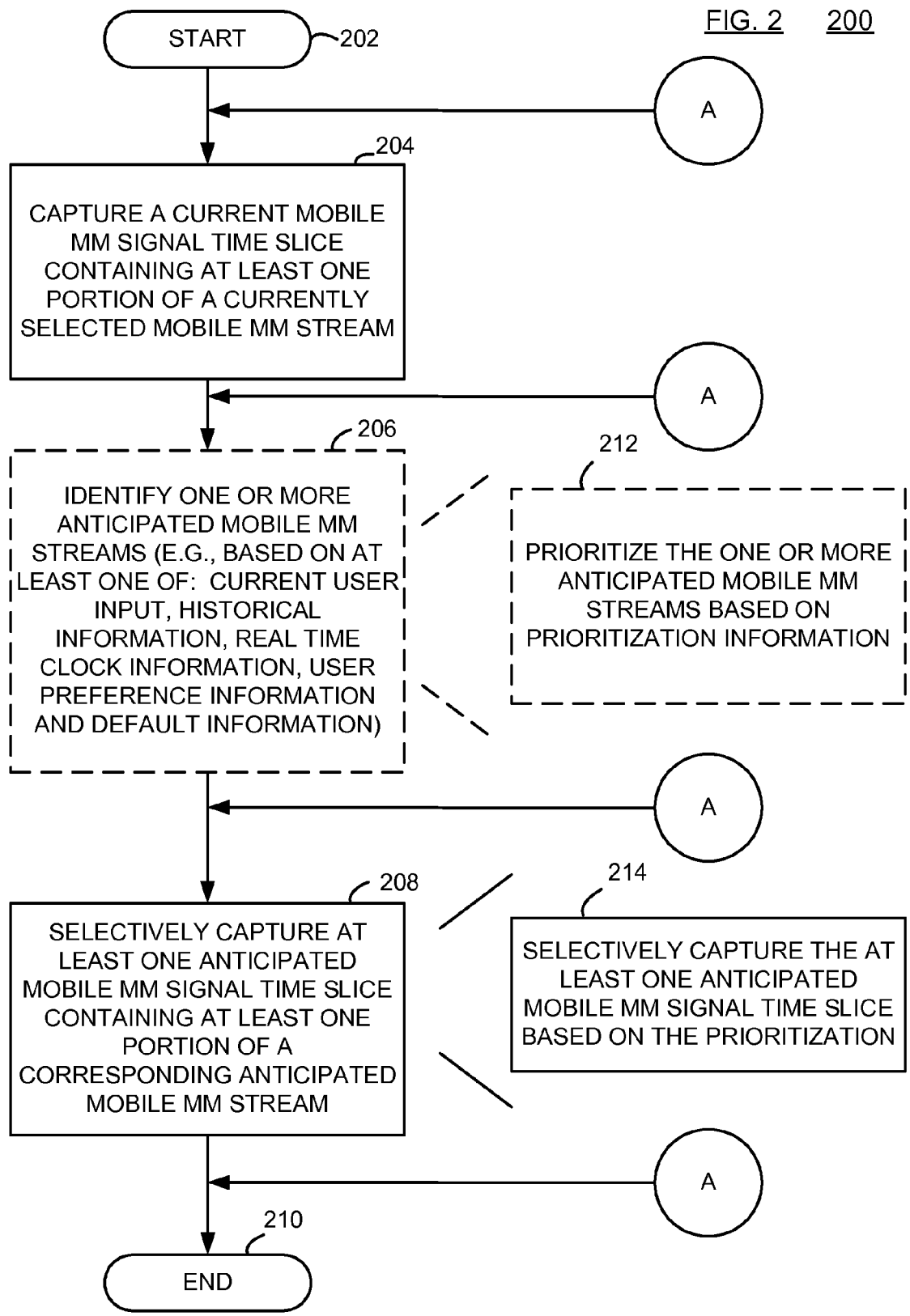
FIG. 2 is a flow chart illustrating one example of a method for capturing mobile multimedia signals in accordance with one embodiment of the present disclosure.

FIG. 2 is a flow chart illustrating one example of a method for capturing mobile multimedia signals in accordance with one embodiment of the present disclosure. The method begins in block 202 where, for example, a user provides a current mobile MM stream-identifying command input. As provided above, the current mobile MM stream-identifying command input may be received by the one or more input devices 124. Proceeding in block 204 the method includes capturing a current mobile MM signal time slice containing at least one portion of a currently selected mobile MM stream. The method optionally continues block 206 where one or more anticipated mobile MM streams are identified, for example, based on at least one of: current user input, historical information, real time clock information, user preference information and default information. In another embodiment, the one or more anticipated mobile MM streams are identified by any other suitable information. In one embodiment, this may be implemented using predictor 104, user input from the one or more input devices 124, and information stored in the at least one memory 126. The method then continues in block 208 where at least one anticipated mobile MM signal time slice containing at least one portion of a corresponding anticipated mobile MM stream is selectively captured. Each of blocks 204 and 208 may, in one embodiment, be implemented using the mobile MM receiver 102 components as controlled by any suitable information such as tuning information 122, power control information 132 and/or clock control information 138 as explained above. The method concludes in block 210 where, for example, at least one time slice is demodulated and subsequently decoded.

As illustrated, block 206 may, in one embodiment, include the method of block 212 where the one or more anticipated mobile MM streams are prioritized based on prioritization information. As provided above, this may be implemented using predetermined priority information stored in the at least one memory 126. Similarly, block 208 may include the method of block 214 where, for example, at least one anticipated mobile MM signal time slice is selectively captured based on the prioritization.

Figure 3:
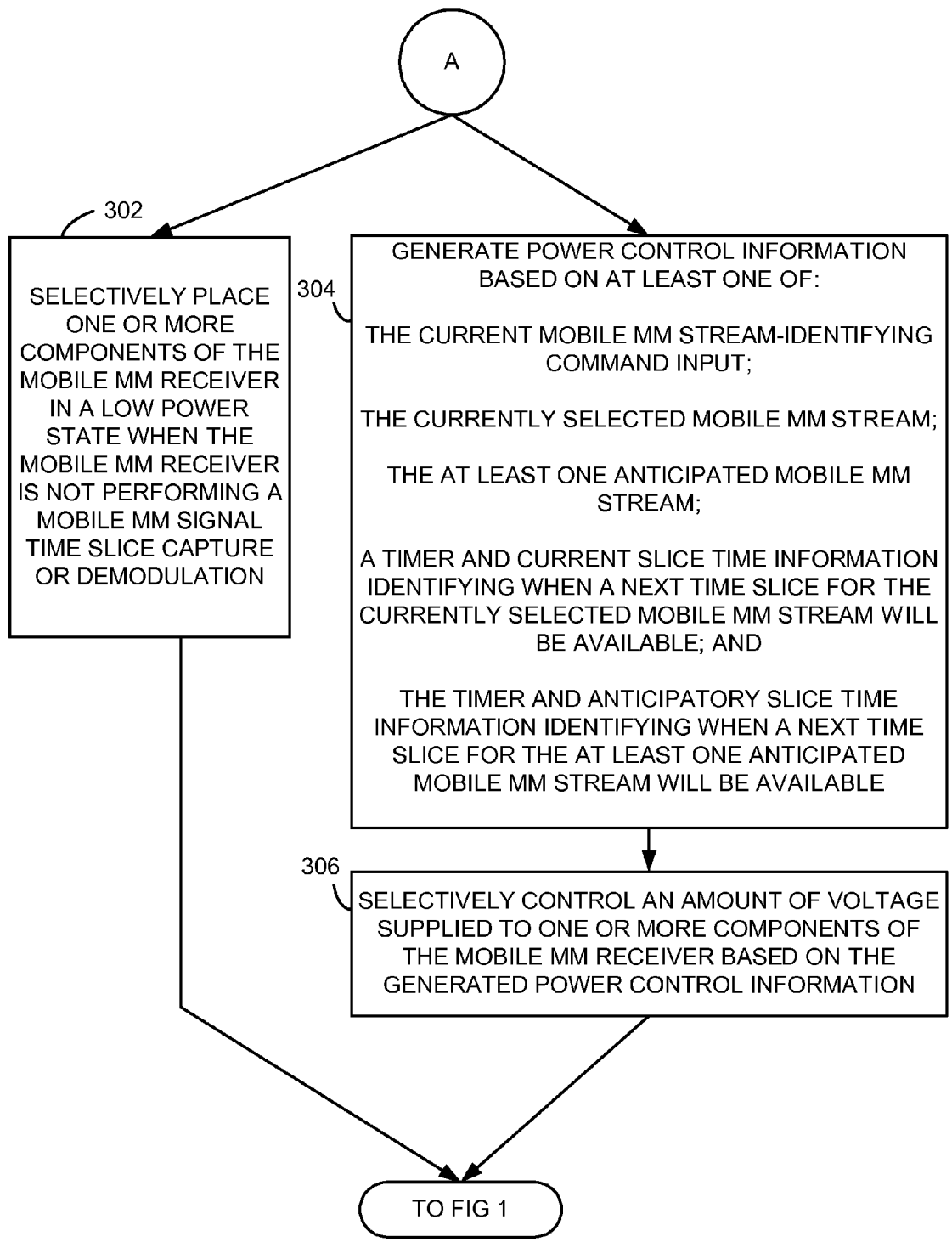
FIGS. 3-4 are flow charts illustrating examples of a method for reducing power in a computing device by placing one or more components of a mobile multimedia receiver in a low power state in accordance with the flow chart of FIG. 2 and one embodiment of the present disclosure.
Figure 4:
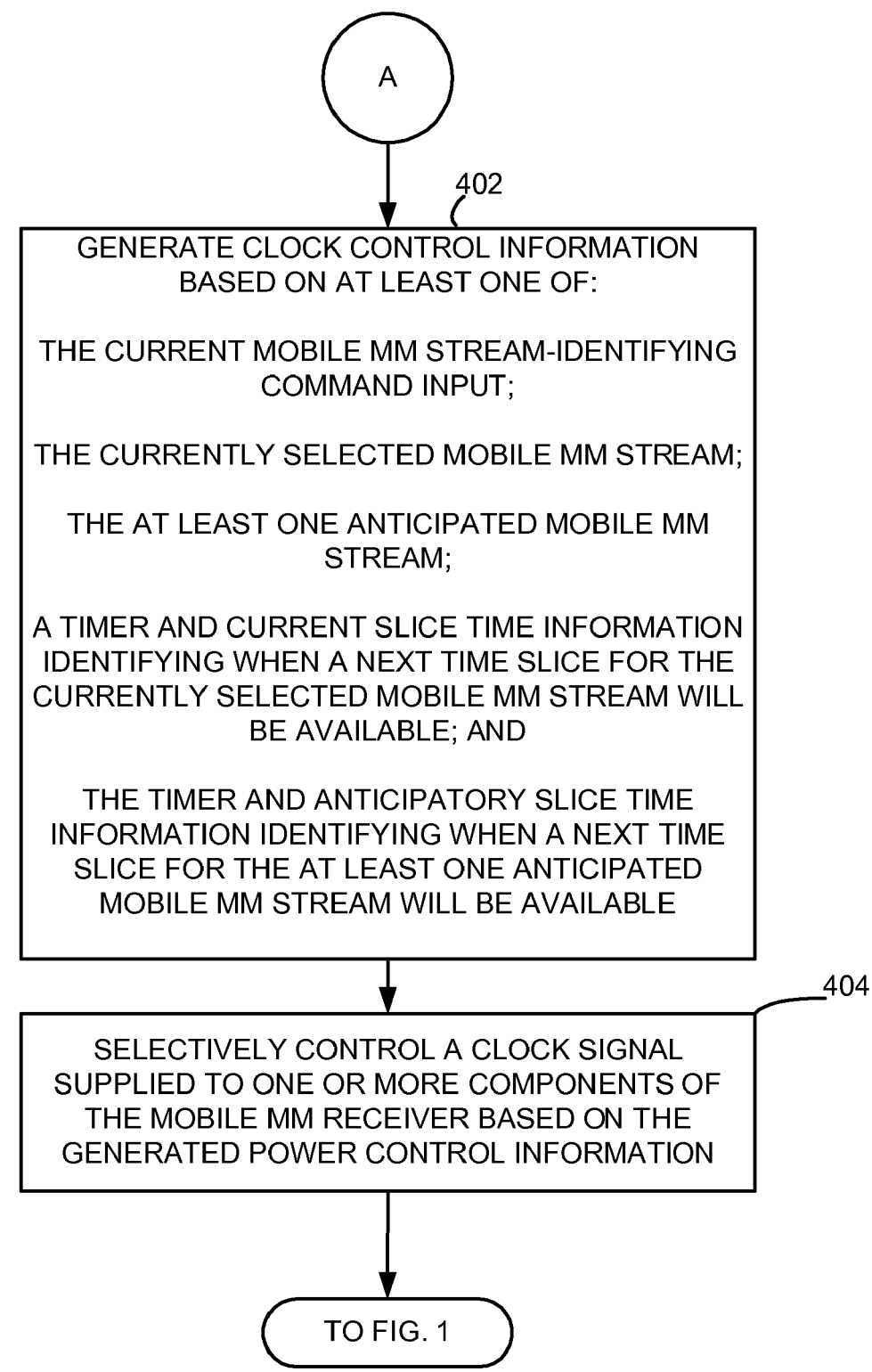
Figure 5:
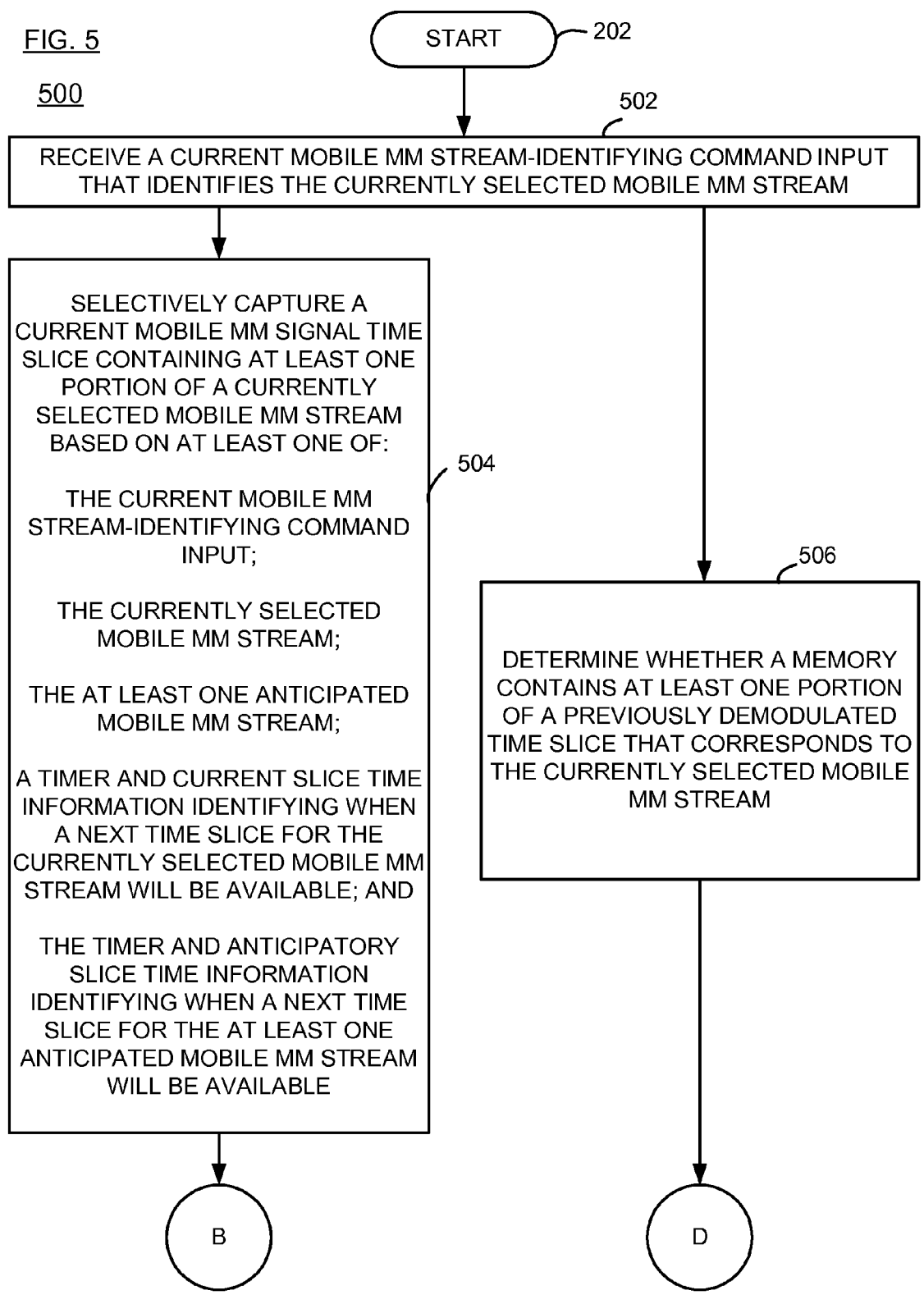
FIGS. 5-8 are flow charts illustrating one example of a method for capturing mobile multimedia streams in accordance with another embodiment of the present disclosure.

As further indicated, the method may include at any point, additional blocks referenced by alpha numeral A. The method of alpha numeral A is illustrated in FIGS. 3-4 which illustrate examples of a method for reducing power in a computing device by placing one or more components of a mobile multimedia receiver in a low power state in accordance with the flow chart of FIG. 2 and one embodiment of the present disclosure. Turning first to FIG. 3, the method referenced by alpha numeral A includes one of block 302 or blocks 304-306. Block 302 includes selectively placing one or more components of the mobile MM receiver in a low power state when the mobile MM receiver is not performing a mobile MM signal time slice capture or demodulation. As previously described, this may be implemented using power controller 118, the one or more input devices 124 and/or information stored in the at least one memory 126.

Alternatively, the method may include generating power control information, as indicated in block 304, based on at least one of: the current mobile MM stream-identifying command input, the currently selected mobile MM stream, the at least one anticipated mobile MM stream, a timer and current slice time information, and a timer and anticipatory slice time information. The method then includes selectively controlling an amount of voltage supplied to one or more components of the mobile MM receiver based on the generated power control information as indicated in block 306. In an exemplary embodiment, the method of blocks 304-306 may be implemented using the power controller 118, a power gate switch 130 and at least one of the: one or more input devices 124, a timer 128 and a variety of information stored in the at least one memory 126. The method then continues at the suitable point in FIG. 1.

As indicated in FIG. 4, the method may alternatively include the method of blocks 402-404. In block 402, the method includes generating clock control information based on at least one of: the current mobile MM stream-identifying command input, the currently selected mobile MM stream, the at least one anticipated mobile MM stream, a timer and current slice time information, and a timer and anticipatory slice time information. The method then includes selectively controlling a clock signal supplied to the one or more components of the mobile MM receiver based on the generated power control information. In an exemplary embodiment, the method of blocks 402-404 may be implemented using the power controller 118, a clock control switch 134 and at least one of the: one or more input devices 124, a timer 128 and a variety of information stored in the at least one memory 126. The method then continues at the suitable point in FIG. 1.

FIGS. 5-8 are flow charts illustrating one example of a method for capturing mobile multimedia streams in accordance with another embodiment of the present disclosure. The method begins as indicated in block 202 above and continues with block 502 where a current mobile MM stream-identifying command input identifying the currently selected mobile MM stream is received. Block 202 may be implemented, in one example, using the one or more input devices 124. The method then continues with blocks 504 and 506. Blocks 504 (and its progeny as indicated by alpha numeral B) and 506 may be performed, simultaneously, concurrently, contemporaneously or back to back with either block leading or following. Block 504 and its progeny will be discussed first. Thus, in block 504 a current mobile MM signal time slice containing at least one portion of a currently selected mobile MM stream is selectively captured based on at least one of: the current mobile MM stream-identifying command input, the currently selected mobile MM stream, the at least one anticipated mobile MM stream, a timer and current slice time information, and a timer and anticipatory slice time information. As explained above, this may be implemented using, among other things, power controller 118 and/or tuner controller 120.

Figure 6:
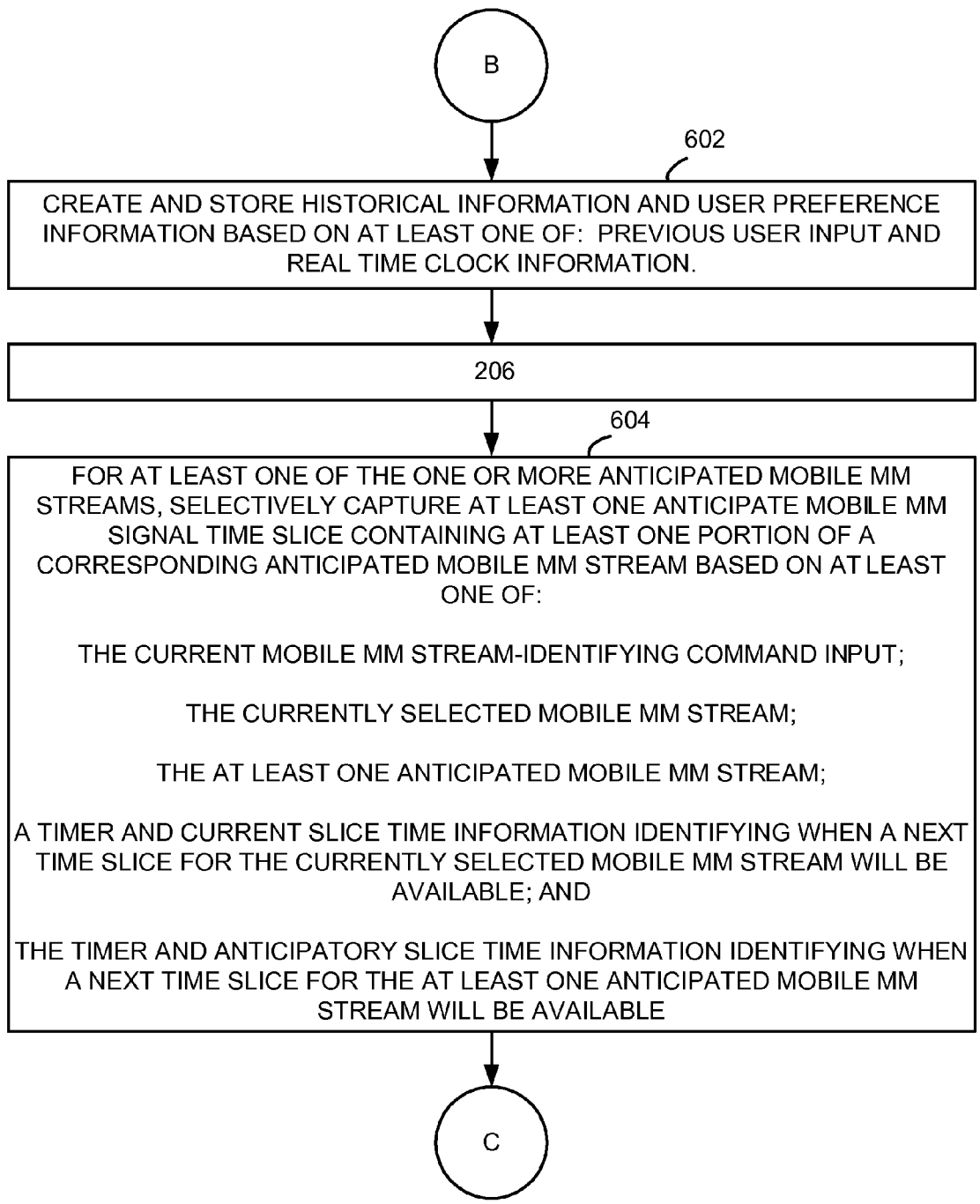
Figure 7:
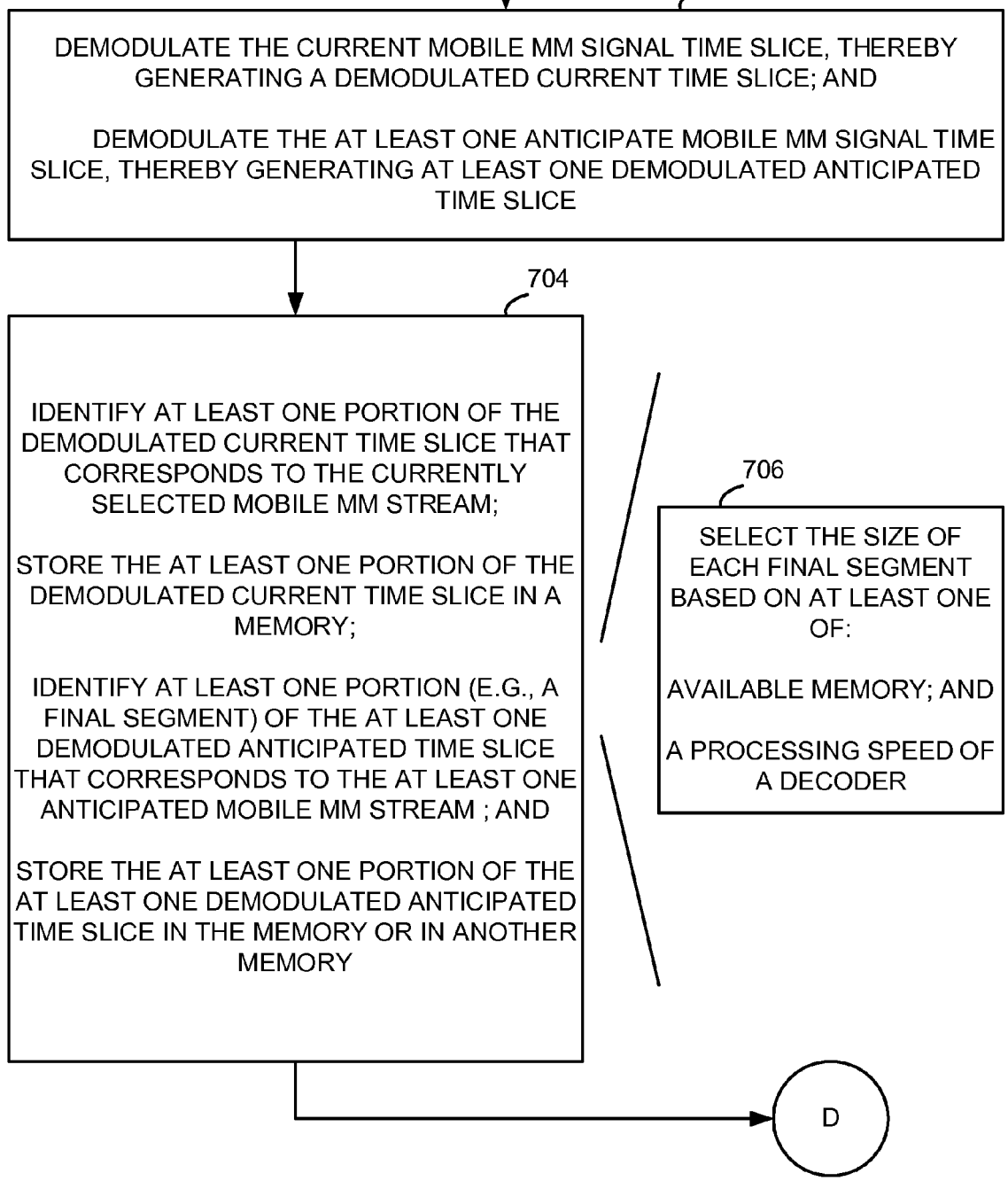
Figure 8:
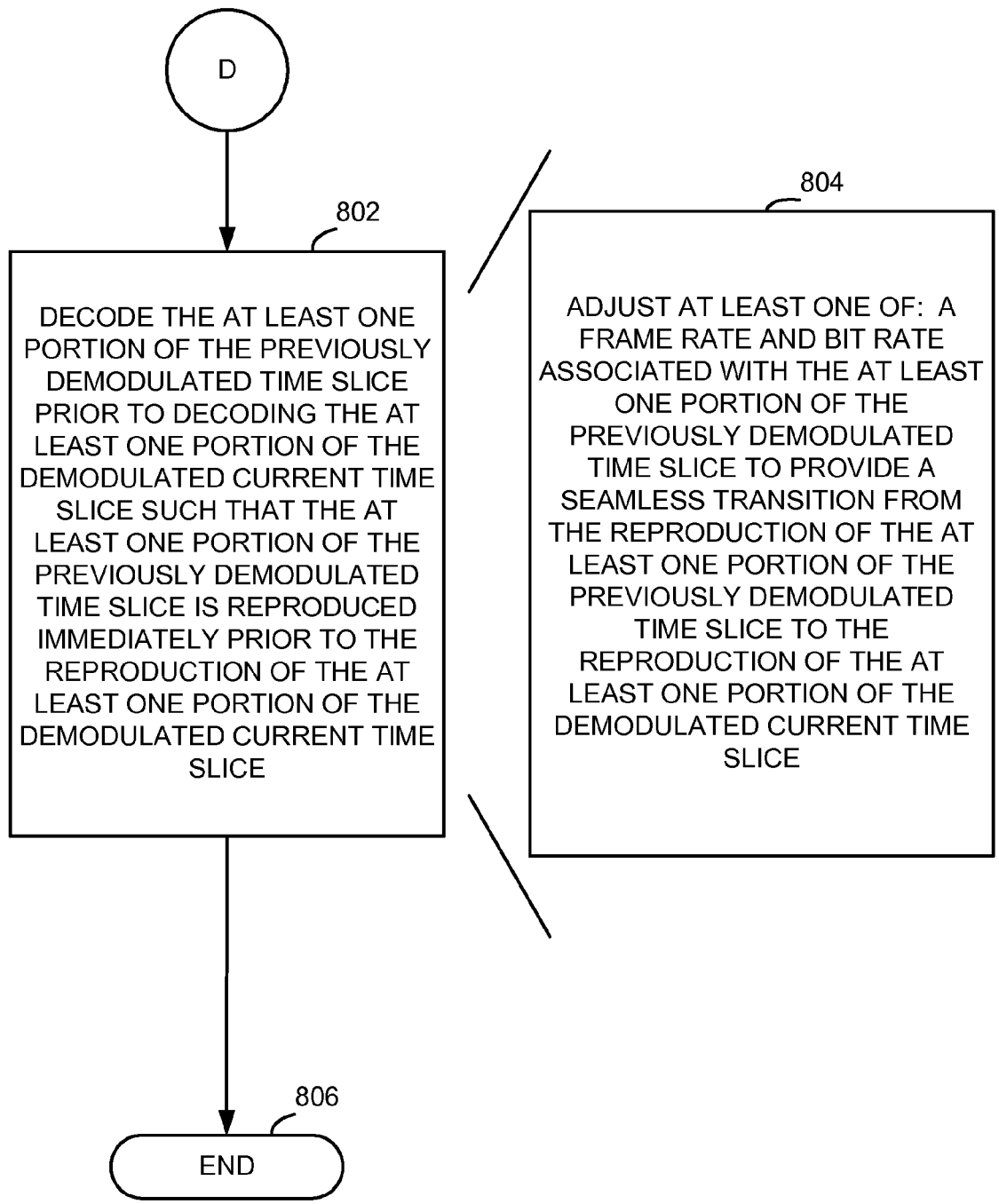

The method continues in FIG. 6 as indicated by alpha numeral B. In block 602, historical information and user preference information is created and stored based on at least one of: previous user input and real time clock information. As discussed above, this may be implemented using, among other things, history and user preferences controller 116 of FIG. 1. Although positioned at this location in FIG. 6, it is recognized that block 602 may be positioned at any location in the method. The method then continues with block 206 as discussed in FIG. 2 and block 604 which is equivalent to block 208 but where the method is based at least one of: on the current mobile MM stream-identifying command input, the currently selected mobile MM stream, the at least one anticipated mobile MM stream, a timer and current slice time information, and a timer and anticipatory slice time information. Block 604 is implemented in one embodiment in the same manner as block 208. The method the continues with FIG. 7 as referenced by alpha numeral C.

In block 702, the current mobile MM signal time slice is demodulated thereby generating a demodulated current time slice. Also in block 702, the at least one anticipated mobile MM signal time slice is demodulated thereby generating at least one demodulated anticipated time slice. In an exemplary embodiment, this may be implemented using demodulator 108. Next, the method includes identifying at least one portion of the demodulated current time slice that corresponds to the at least one portion of the currently selected mobile MM stream and storing the at least one portion of the demodulated current time slice in a memory, as per block 704. Block 704 also includes identifying and storing in the memory or in another memory at least one portion of the at least one demodulated anticipated time slice that corresponds to the at least one anticipated mobile MM stream. In one embodiment, the at least one portion of the at least one demodulated anticipated time slice represents a final segment of the anticipated mobile MM stream represented in the at least one anticipated mobile MM signal time slice, as indicated in block 706. The size of the final segment may be based on at least one of: available memory, an available processing speed of a decoder and/or an available processing capacity of the decoder. Blocks 704-706 may be implemented using the mobile MM router 114 and the at least one memory 126. The method then continues in FIG. 8 as indicated by alpha numeral D.

Returning to FIG. 5, the method of block 506 includes determining whether a memory contains at least one portion of a generated demodulated time slice that corresponds to the currently selected mobile MM stream. In one embodiment, this may be implemented using the mobile MM router 114. The method then continues in FIG. 8 as indicated by alpha numeral D.

Block 802 includes decoding the at least one portion of the previously demodulated time slice prior to decoding the at least one portion of the demodulated current time slice such that that least one portion of the previously demodulated time slice is reproduced immediately prior to the reproduction of the at least one portion of the demodulated current time slice. In one embodiment, block 802 includes adjusting at least one of: a frame rate and a bit rate associated with the at least one portion of the previously demodulated time slice to provide a seamless transition from the reproduction of the at least one portion of the previously demodulated time slice to the reproduction of the at least one portion of the demodulated current time slice. Blocks 802-804, in an exemplary embodiment, are implemented using decoder 148. The method concludes with block 806 where the user is provided a smooth and fast transition from one mobile MM stream to another.

Figure 9:
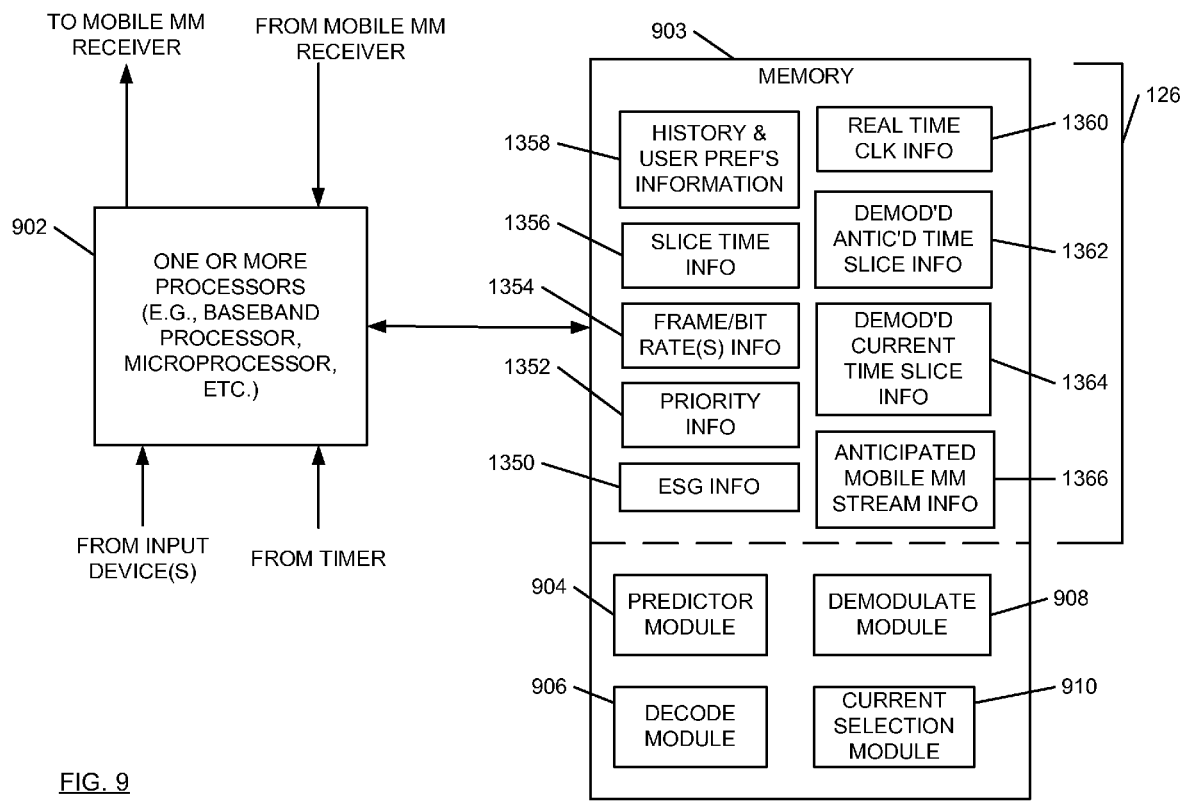
FIG. 9 is a block diagram illustrating another example of at least a portion of a computing device in accordance with one embodiment of the present disclosure that includes at least one or more processors coupled to at least one memory having executable instructions stored therein for execution on the one or more processors.

FIG. 9 is a block diagram illustrating another example of at least a portion of a computing device in accordance with one embodiment of the present disclosure that includes at least one or more processors 902 coupled to at least one memory 903 having executable instructions stored therein for execution on the one or more processors. As indicated the one or more processors 902 may be substituted for at least one portion of the controller 112 of FIG. 1. In another embodiment, the one or more processors 902 includes any combination of the one or more components of the controller 112, the baseband processor 142 and the decoder 148. In one embodiment, the one or more processors may be implemented using any number of processors, microprocessors, DSPs, etc. and may be implemented using one or more or any combination of integrated circuits, IC packages and discrete electronic components. As illustrated, the one or more processors 902 is coupled to memory 903 which includes segments 1350-1366 as previously described with reference to the at least one memory 126 of FIGS. 1 and 13. Memory 903 also contains executable instructions for execution on the one or more processors 902. When the executable instructions are executed on the one or more processors 902, the one or more processors 902 performs the equivalent operations discussed above with respect to the components of controller 112. For purposes of example, sample segments of executable instructions 904-910 are illustrated as stored within 903. The illustration, is merely for purposes of illustration and are not intended to limit the type of instructions that may be stored in memory 903 or the manner in which the executable instructions may be stored. That is, the instructions need not be stored in a segmented manner. Memory 903 may be implemented in the same manner described above with reference to the at least one memory 126 and may also include one or more memories like memory 126.

Figure 10:
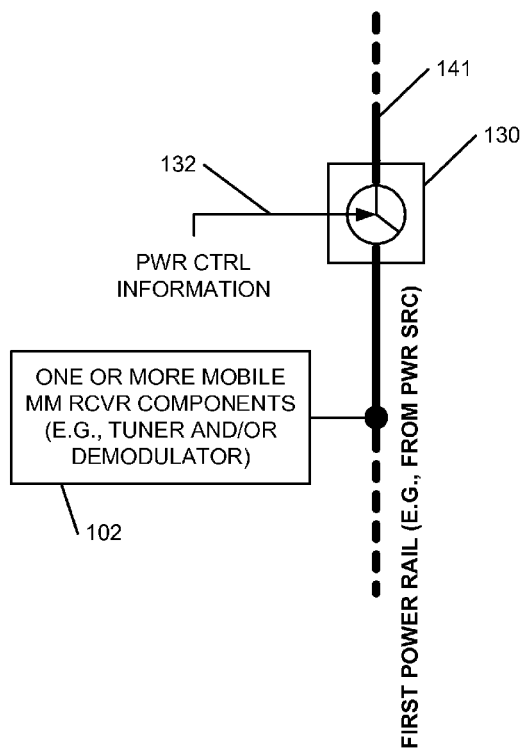
FIGS. 10-11 illustrate block diagrams of power gating switches that selectively control the amount of voltage supplied to one or more mobile multimedia receiver components in accordance with one embodiment of the present disclosure.
Figure 11:
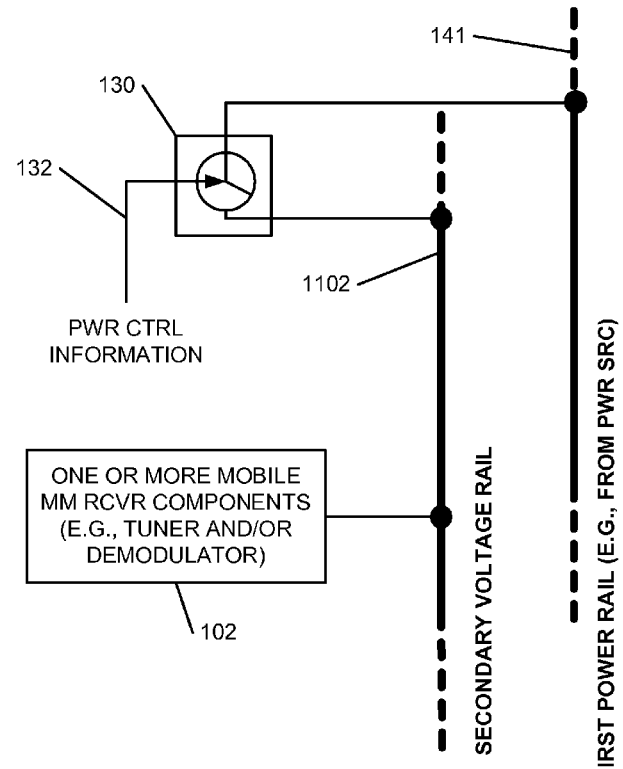

FIGS. 10-11 illustrate block diagrams of power gating switches 130 that selectively control the amount of voltage supplied to one or more mobile multimedia receiver 102 components in accordance with one embodiment of the present disclosure. FIG. 10 includes a first power rail 141 coupled to at least one power control switch 130 and one or more mobile MM receiver 102 components. The first power rail 141 may be generated by power source 140 and is one voltage supply source for the one or more components of the mobile MM receiver 102. As illustrated, the power control switch 130 is coupled to receive the power control information 132 from, for example, power controller 118. When the power control switch 130 is open, the one or more mobile MM receiver 102 components are disconnected from the first power rail 141 and thus are disconnected from at least one voltage power supply.

FIG. 11 includes a first power rail 141 coupled to at least one power control switch 130. The power control switch 130 couples the first power rail 141 to a secondary voltage rail 1102 which is coupled to the one or more components of the mobile MM receiver 102. The secondary voltage rail 1102 may be one of several voltage rails that supply a voltage to the one or more components of the mobile MM receiver 102 components. As known in the art, the use of secondary voltage rails may be used as voltage islands to create one or more voltage domains. As in FIG. 10, the power control information 132 is coupled to control the power control switch 130 such that when the power control switch 130 is open the secondary voltage rail 1102 is no longer maintained at the same voltage as the first power rail 141. However, when the power control switch 130 is closed, the secondary voltage rail 1102 is ideally maintained at the same voltage as the first power rail 141.

Figure 12:
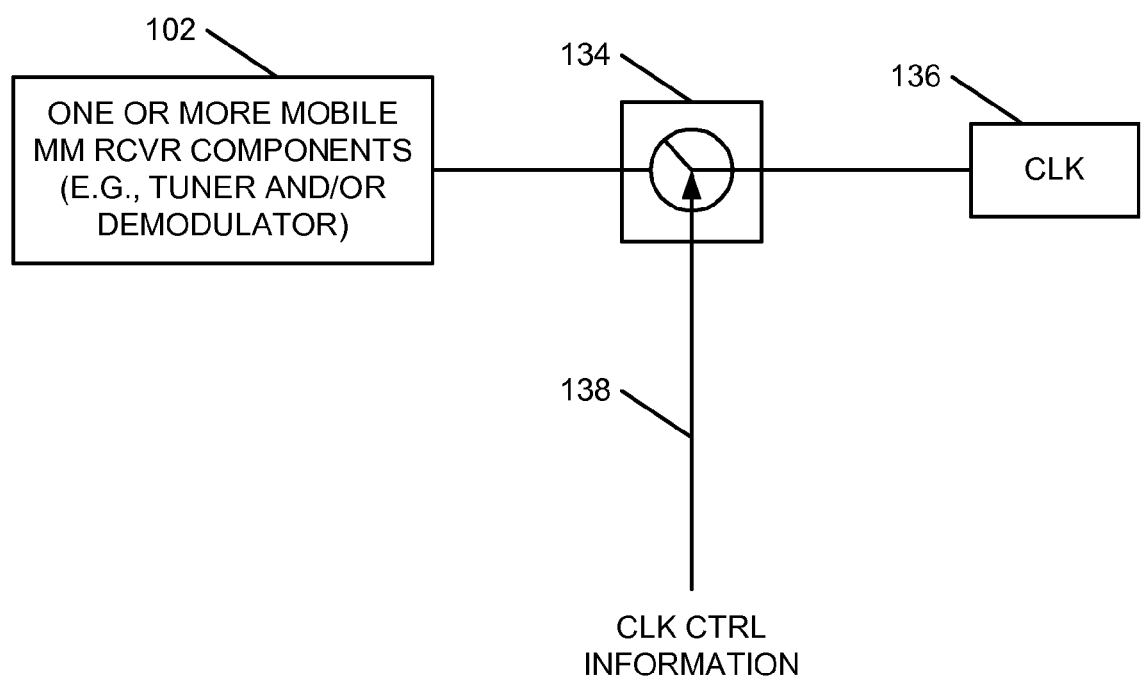
FIG. 12 illustrates a block diagram of a clock control switch that selectively controls a clock signal supplied to one or more components of the mobile multimedia receiver in accordance with one embodiment of the present disclosure.

FIG. 12 illustrates a block diagram of a clock control switch 134 that selectively controls a clock signal supplied to one or more components of the mobile multimedia receiver 102 in accordance with one embodiment of the present disclosure. As illustrated, the clock control switch 134 is coupled to receive the clock signal from clock 136 and is controlled by clock control information 138 as generated by, for example, power controller 118. In one embodiment, clock control switch 136 may be any suitable circuit or device implementing the function of a logic AND gate having as clock control information 138 as an input, as known in the art. When the clock control switch 134 is closed, the clock signal from clock 136 is supplied to the one or more components of the mobile MM receiver 102. The opposite is true when the clock control switch 134 is open. As recognized in the art, by removing the clock signal (or otherwise reducing its frequency), less power is consumed by the mobile MM receiver 102 and its components.

Figure 14:
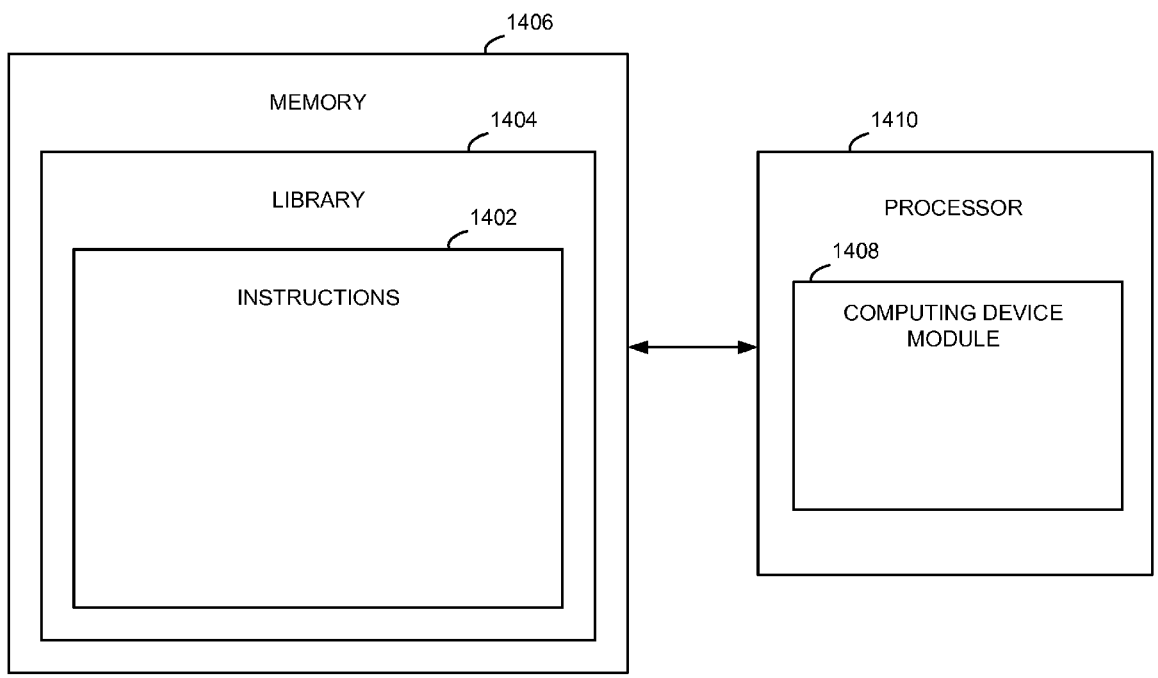
FIG. 14 illustrates a block diagram of an exemplary hardware design that may be used to implement one embodiment of the present disclosure.

FIG. 14 illustrates a block diagram 1400 of an exemplary computing device design system 1400 that may be used to implement one embodiment of the present disclosure. To this end, as known by those of skill in the art, a set of executable instructions 1402 may be defined and stored within a library 1404 that in turn is stored in memory 1406. The instructions 1402, which may include instructions represented in any suitable hardware design language (HDL) including, but not limited to, Verilog or another hardware representation such as GDSII, can be used by the computing device module 1408 that is executed by one or more processors 1410 of the computing device design system 1400. Module 1408 is illustrated as being executed by the one or more processors 1410 and may correspond to, for example, any suitable hardware design application as known in the art. Using instructions 1402, the system 1400 may be employed to create a suitable computing device such as computing device 100 of FIG. 1 or any portion thereof. System 1400 and computing device module 1408 may be any suitable system and computing device module as known to those skilled in the art. As further recognized, memory 1406 may be any suitable memory such as at least one memory 126 of FIG. 1. Similarly, the one or more processors 1410 may be any suitable processor as explained above with reference to baseband processor 142.

Thus, a method and apparatus has been disclosed that addresses the above needs of the prior art. Specifically, a mobile MM receiver captures a currently mobile MM signal time slice containing at least one portion of a currently selected mobile MM stream. The currently selected mobile MM stream may be identified by a current mobile MM stream-identifying command input. Similarly, the mobile MM receiver selectively captures at least one anticipated mobile MM time slice containing at least one portion of a corresponding anticipated mobile MM stream. A predictor may be used to identify and prioritize one or more anticipated mobile MM streams. Based on the prioritization, the mobile MM stream receiver may selectively capture the at least one anticipate mobile MM signal time slice.

In response to a current mobile MM stream-identifying command input, the method and apparatus determines if a previous prediction was accurate. If a previous prediction was accurate, at least one portion of an anticipated mobile MM time slice that corresponds to the currently selected mobile MM stream was previously demodulated and stored in memory. Accordingly, it may be decoded and reproduced immediately before at least one portion of the current mobile MM signal time slice is decoded and reproduced. Various techniques have been introduced to preserve continuity during this transition.

Among other advantages, the above method and apparatus reduces the zapping delay that is often associated with less-than-desirable viewing environments. In one embodiment, one or more components of the mobile MM receiver may be placed in a low power state when not capturing and/or demodulating a time slice thereby keeping the overall power consumption on the device or system to a minimum. Other advantages will be recognized by one of ordinary skill in the art.

It will also be recognized that the above description describes mere examples and that other embodiments are envisioned and covered by the appended claims. It is therefore contemplated that the present invention cover any and all modifications, variations or equivalents that fall within the spirit and scope of the basic underlying principles disclosed above and claimed herein.

What is claimed is:

1. A computing device comprising:
a mobile multimedia ("MM") receiver operative to capture a current mobile MM signal time slice containing at least one portion of a currently selected mobile MM stream, and further operative to selectively capture at least one anticipated mobile MM time slice containing at least one portion of a corresponding anticipated mobile MM stream, wherein
the mobile MM receiver comprises a demodulator operative to demodulate the current mobile MM signal time slice, thereby generating a demodulated current time slice, and demodulate the at least one anticipated mobile MM signal time slice, thereby generating at least one demodulated anticipated time slice, and wherein
the computing device further comprises a mobile MM router operative to identify at least one portion of the demodulated current time slice that corresponds to the currently selected mobile MM stream and store the at least one portion of the demodulated current time slice in a memory, and identify at least one portion of the at least one demodulated anticipated time slice that corresponds to the at least one anticipated mobile MM stream, and store the at least one portion of the at least one demodulated anticipated time slice in the memory or in another memory, wherein the at least one portion of the at least one demodulated anticipated time slice represents a final segment of the anticipated mobile MM stream represented in the at least one anticipated mobile MM signal time slice, and wherein the mobile MM router is further operative to obtain, and adjust a size of the final segment based on, at least one of: available memory, an available processing speed of a decoder, and an available processing capacity of the decoder.

2. The computing device of claim 1, further comprising a predictor operative to identify one or more anticipated mobile MM streams prior to selectively capturing the at least one anticipated mobile MM time slice.

3. The computing device of claim 2, wherein the predictor comprises one or more processors operatively coupled to memory containing executable instructions.

4. The computing device of claim 1, further comprising a predictor operative to identify one or more anticipated mobile MM streams, prior to selectively capturing the at least one anticipated mobile MM time slice, based on at least one of: current user input, historical information, real time clock information, user preference information and default information.

5. The computing device of claim 2, wherein the computing device comprises an input operative to receive a current mobile MM stream-identifying command input that identifies the currently selected mobile MM stream.

6. The computing device of claim 2, wherein:
the predictor is operative to prioritize the one or more anticipated mobile MM streams based on prioritization information; and
the mobile MM receiver is operative to selectively capture the at least one anticipated mobile MM signal time slice based on the prioritization.

7. The computing device of claim 1, further comprising a power controller, wherein when the mobile MM receiver is not performing a mobile MM signal time slice capture or demodulation, the power controller is operative to selectively place one or more components of the mobile MM receiver in a low power state.

8. The computing device of claim 7, wherein the power controller comprises one or more processors operatively coupled to memory containing executable instructions.

9. The computing device of claim 5, further comprising:
a power controller operative to generate power control information based on at least one of:
the current mobile MM stream-identifying command input;
the currently selected mobile MM stream;
the at least one anticipated mobile MM stream;
a timer and current slice time information identifying when a next time slice for the currently selected mobile MM stream will be available; and
the timer and anticipated slice time information identifying when a next time slice for the at least one anticipated mobile MM stream will be available;
and
a power gate switch operative to selectively control an amount of voltage supplied to one or more components of the mobile MM receiver based on the generated power control information.

10. The computing device of claim 5, further comprising:
a power controller is operative to generate clock control information based on at least one of:
the current mobile MM stream-identifying command input;
the currently selected mobile MM stream;
the at least one anticipated mobile MM stream;
a timer and current slice time information identifying when the next time slice for the currently selected mobile MM stream will be available; and
the timer and anticipated slice time information identifying when the next time slice for the at least one anticipated mobile MM stream will be available; and
a clock control switch operative to selectively control a clock signal supplied to the one or more components of the mobile MM receiver based on the clock control information.

11. The computing device of claim 5, wherein:
the mobile MM receiver comprises a tuner operative to capture the current mobile MM signal time slice and the at least one anticipated mobile MM signal time slice; and
the computing device further comprises a tuner controller operative to selectively control the tuner based on at least one of:
the current mobile MM stream-identifying command input;
the currently selected mobile MM stream;
the at least one anticipated mobile MM stream;
a timer and current slice time information identifying when a next time slice for the currently selected mobile MM stream will be available; and
the timer and anticipated slice time information identifying when a next time slice for the at least one anticipated mobile MM stream will be available.

12. The computing device of claim 11, wherein the tuner controller comprises one or more processors operatively coupled to memory containing executable instructions.

13. The computing device of claim 1, further comprising a history and user preferences controller operative to create and store historical information and user preference information based on at least one of: previous user input and real time clock information.

14. The computing device of claim 1, wherein the demodulator comprises one or more processors operatively coupled to memory containing executable instructions.

15. The computing device of claim 1, wherein the demodulated current time slice and the at least one demodulated anticipated time slice each comprise one or more IP datagrams.

16. The computing device of claim 1, further comprising:
a decoder;
wherein, in response to a current mobile MM stream-identifying command input identifying the currently selected mobile MM stream, the MM router is operative to determine whether the memory contains at least one portion of a previously demodulated time slice that corresponds to the currently selected mobile MM stream; and
wherein the decoder is operative to decode the at least one portion of the previously demodulated time slice prior to decoding the at least one portion of the demodulated current time slice such that the at least one portion of the previously demodulated time slice is reproduced immediately prior to the reproduction of the at least one portion of the demodulated current time slice.

17. The computing device of claim 16, wherein the decoder comprises one or more processors operatively coupled to memory containing executable instructions.

18. The computing device of claim 16, wherein the decoder is further operative to adjust at least one of: a frame rate and bit rate associated with the at least one portion of the previously demodulated time slice to provide a seamless transition from the reproduction of the at least one portion of the previously demodulated time slice to the reproduction of the at least one portion of the demodulated current time slice.

19. The computing device of claim 4, wherein the current user input comprises at least one of:
   a navigational command input for controlling the reproduction of an Electronic Service Guide; and
   a mobile MM stream-identifying command input for identifying a broadcasted currently selected mobile MM stream.

20. The computing device of claim 1, wherein each of the current mobile MM signal time slice and the at least one anticipated mobile MM time slice:
   is a portion of a time-division multiplexed mobile MM signal; and
   comprises one or more mobile MM streams.

21. The computing device of claim 20, wherein each mobile MM signal is a Digital Video Broadcast-Handheld signal.

22. A method for capturing mobile multimedia ("MM") signals comprising:
   capturing a current mobile MM signal time slice containing at least one portion of a currently selected mobile MM stream, and selectively capturing at least one anticipated mobile MM time slice containing at least one portion of a corresponding anticipated mobile MM stream;
   demodulating the current mobile MM signal time slice, thereby generating a demodulated current time slice, and demodulating the at least one anticipated mobile MM signal time slice, thereby generating at least one demodulated anticipated time slice;
   identifying at least one portion of the demodulated current time slice that corresponds to the currently selected mobile MM stream, and storing the at least one portion of the demodulated current time slice in a memory; and
   identifying at least one portion of the at least one demodulated anticipated time slice that corresponds to the at least one anticipated mobile MM stream, and storing the at least one portion of the at least one demodulated anticipated time slice in the memory or in another memory, wherein the at least one portion of the at least one demodulated anticipated time slice represents a final segment of the anticipated mobile MM stream represented in the at least one anticipated mobile MM signal time slice; and
   obtaining, and adjusting a size of the final segment based on, at least one of: available memory, an available processing speed of a decoder, and an available processing capacity of the decoder.

23. The method of claim 22, further comprising identifying one or more anticipated mobile MM streams prior to selectively capturing the at least one anticipated mobile MM time slice.

24. The method of claim 22, further comprising identifying one or more anticipated mobile MM streams, prior to selectively capturing the at least one anticipated mobile MM time slice, based on at least one of: current user input, historical information, real time clock information, user preference information and default information.

25. The method of claim 23, further comprising receiving a current mobile MM stream-identifying command input that identifies the currently selected mobile MM stream.

26. The method of claim 23, further comprises:
   prioritizing the one or more anticipated mobile MM streams based on prioritization information; and
   wherein selectively capturing the at least one anticipated mobile MM signal time slice comprises selectively capturing the at least one anticipated mobile MM signal time slice based on the prioritization.

27. The method of claim 22, further comprising selectively placing one or more components of the mobile MM receiver in a lower power state when the mobile MM receiver is not performing a mobile MM signal time slice capture or demodulation.

28. The method of claim 25, further comprising:
   generating power control information based on at least one of:
      the current mobile MM stream-identifying command input;
      the currently selected mobile MM stream;
      the at least one anticipated mobile MM stream;
      a timer and current slice time information identifying when a next time slice for the currently selected mobile MM stream will be available; and
      the timer and anticipated slice time information identifying when a next time slice for the at least one anticipated mobile MM stream will be available; and
   selectively controlling an amount of voltage supplied to one or more components of the mobile MM receiver based on the generated power control information.

29. The method of claim 25, further comprising:
   generating clock control information based on at least one of:
      the current mobile MM stream-identifying command input;
      the currently selected mobile MM stream;
      the at least one anticipated mobile MM stream;
      a timer and current slice time information identifying when a next time slice for the currently selected mobile MM stream will be available; and
      the timer and anticipated slice time information identifying when a next time slice for the at least one anticipated mobile MM stream will be available;
   and
   selectively controlling a clock signal supplied to the one or more components of the mobile MM receiver based on the clock control information.

30. The method of claim 25, wherein capturing the current mobile MM signal time slice and selectively capturing the at least one anticipated mobile MM signal time slice comprises selectively controlling a tuner based on at least one of:
   the current mobile MM stream-identifying command input;
   the currently selected mobile MM stream;
   the at least one anticipated mobile MM stream;
   a timer and current slice time information identifying when a next time slice for the currently selected mobile MM stream will be available; and
   the timer and anticipated slice time information identifying when a next time slice for the at least one anticipated mobile MM stream will be available.

31. The method of claim 22, further comprising creating and storing historical information and user preference information based on at least one of: previous user input and real time clock information.

32. The method of claim 22, further comprising:
in response to a current mobile MM stream-identifying command input identifying the currently selected mobile MM stream, determining whether a memory contains at least one portion of a previously demodulated time slice that corresponds to the currently selected mobile MM stream; and
decoding the at least one portion of the previously demodulated time slice prior to decoding the at least one portion of the demodulated current time slice such that the at least one portion of the previously demodulated time slice is reproduced immediately prior to the reproduction of the at least one portion of the demodulated current time slice.

33. The method of claim 32, further comprising adjusting at least one of: a frame rate and bit rate associated with the at least one portion of the previously demodulated time slice to provide a seamless transition from the reproduction of the at least one portion of the previously demodulated time slice to the reproduction of the at least one portion of the demodulated current time slice.

34. The method of claim 22, wherein each of the current mobile MM signal time slice and the at least one anticipated mobile MM time slice:
is a portion of a time-division multiplexed mobile MM signal; and
comprises one or more mobile MM streams.

35. Memory having instructions executable by one or more processors that causes the one or more processors to:
control a mobile multimedia ("MM") receiver to capture a current mobile MM signal time slice containing at least one portion of a currently selected mobile MM stream, and control the mobile MM receiver to selectively capture at least one anticipated mobile MM time slice containing at least one portion of a corresponding anticipated mobile MM stream;
demodulate the current mobile MM signal time slice, thereby generating a demodulated current time slice, and demodulate the at least one anticipated mobile MM signal time slice, thereby generating at least one demodulated anticipated time slice;
identify at least one portion of the demodulated current time slice that corresponds to the currently selected mobile MM stream and store the at least one portion of the demodulated current time slice in a memory, and identify at least one portion of the at least one demodulated anticipated time slice that corresponds to the at least one anticipated mobile MM stream, and store the at least one portion of the at least one demodulated anticipated time slice in the memory or in another memory, wherein the at least one portion of the at least one demodulated anticipated time slice represents a final segment of the anticipated mobile MM stream represented in the at least one anticipated mobile MM signal time slice; and
obtain, and adjust a size of the final segment based on, at least one of: available memory, an available processing speed of a decoder, and an available processing capacity of the decoder.

36. The memory of claim 35, wherein the instructions further cause the one or more processors to identify one or more anticipated mobile MM streams prior to selectively capturing the at least one anticipated mobile MM time slice.

37. The memory of claim 35, wherein the instructions further cause the one or more processors to identify one or more anticipated mobile MM streams, prior to selectively capturing the at least one anticipated mobile MM time slice, based on at least one of: current user input, historical information, real time clock information, user preference information and default information.

38. The memory of claim 36, wherein the instructions further cause the one or more processors to:
prioritize the one or more anticipated mobile MM streams based on prioritization information; and
control the mobile MM receiver to selectively capture at least one anticipated mobile MM time slice based on the prioritization.

39. The memory of claim 35, wherein the instructions further cause the one or more processors to selectively place one or more components of the mobile MM receiver in a low power state when the mobile MM receiver is not performing a mobile MM signal time slice capture or demodulation.

40. The memory of claim 36, wherein the instructions further cause the one or more processors to:
generate power control information based on at least one of:
a current mobile MM stream-identifying command input that identifies the currently selected mobile MM stream,
the currently selected mobile MM stream;
the at least one anticipated mobile MM stream;
a timer and current slice time information identifying when a next time slice for the currently selected mobile MM stream will be available; and
the timer and anticipated slice time information identifying when a next time slice for the at least one anticipated mobile MM stream will be available;
and
the computing device further comprises a power gate switch operative to selectively control an amount of voltage supplied to one or more components of a mobile MM receiver based on the generated power control information.

41. The memory of claim 36, wherein the instructions further cause the one or more processors to:
generate clock control information based on at least one of:
the current mobile MM stream-identifying command input;
the currently selected mobile MM stream;
the at least one anticipated mobile MM stream;
a timer and current slice time information identifying when a next time slice for the currently selected mobile MM stream will be available; and
the timer and anticipated slice time information identifying when a next time slice for the at least one anticipated mobile MM stream will be available;
and
the computing device further comprises a clock control switch operative to selectively control a clock signal supplied to the one or more components of the mobile MM receiver based on the clock control information.

42. The memory of claim 36, wherein the instructions further cause the one or more processors to:
selectively control a tuner of the mobile MM receiver to capture the current mobile MM signal time slice and the at least one anticipated mobile MM signal time slice based on at least one of:
the current mobile MM stream-identifying command input;
the currently selected mobile MM stream;
the at least one anticipated mobile MM stream;
a timer and current slice time information identifying when a next time slice for the currently selected mobile MM stream will be available; and the timer and anticipated slice time information identifying when a next time slice for the at least one anticipated mobile MM stream will be available.

43. The memory of claim 35, wherein the instructions further cause the one or more processors to create and store historical information and user preference information based on at least one of: previous user input and real time clock information.

44. The memory of claim 35, wherein the instructions further cause the one or more processors to:
in response to a current mobile MM stream-identifying command input identifying the currently selected mobile MM stream, determine whether the memory contains at least one portion of a previously demodulated time slice that corresponds to the currently selected mobile MM stream; and
decode the at least one portion of the previously demodulated time slice prior to decoding the at least one portion of the demodulated current time slice such that the at least one portion of the previously demodulated time slice is reproduced immediately prior to the reproduction of the at least one portion of the demodulated current time slice.

45. The memory of claim 35, wherein the instructions further cause the one or more processors to:
adjust at least one of: a frame rate and bit rate associated with the at least one portion of the previously generated demodulated time slice to provide a seamless transition from the reproduction of the at least one portion of the previously generated demodulated time slice to the reproduction of the at least one portion of the demodulated current time slice.

46. Memory having instructions executable by one or more processors that causes the one or more processors to design a computing device such that the computing device is operative to:
capture a current mobile MM signal time slice containing at least one portion of a currently selected mobile MM stream, and selectively capture at least one anticipated mobile MM time slice containing at least one portion of a corresponding anticipated mobile MM stream;
demodulate the current mobile MM signal time slice, thereby generating a demodulated current time slice, and demodulate the at least one anticipated mobile MM signal time slice, thereby generating at least one demodulated anticipated time slice;
identify at least one portion of the demodulated current time slice that corresponds to the currently selected mobile MM stream, and store the at least one portion of the demodulated current time slice in a memory;
identify at least one portion of the at least one demodulated anticipated time slice that corresponds to the at least one anticipated mobile MM stream, and store the at least one portion of the at least one demodulated anticipated time slice in the memory or in another memory, wherein the at least one portion of the at least one demodulated anticipated time slice represents a final segment of the anticipated mobile MM stream represented in the at least one anticipated mobile MM signal time slice; and
obtain, and adjust a size of the final segment based on, at least one of: available memory, an available processing speed of a decoder, and an available processing capacity of the decoder.

47. The memory of claim 46, wherein the instructions further cause the one or more processors to design a computing device operative to identify one or more anticipated mobile MM streams, prior to selectively capturing the at least one anticipated mobile MM time slice.

48. The memory of claim 46, wherein the instructions further cause the one or more processors to design a computing device operative to:
prioritize the one or more anticipated mobile MM streams based on prioritization information; and
selectively capture the at least one anticipated mobile MM signal time slice based on the prioritization.

49. The memory of claim 46, wherein the computing device comprises a mobile MM receiver operative to capture the current mobile MM signal time slice and to selectively capture at least one anticipated mobile MM time slice and wherein the instructions further cause the one or more processors to design a computing device operative to selectively place one or more components of the mobile MM receiver in a lower power state when the mobile MM receiver is not performing a mobile MM signal time slice capture or demodulation.

50. The memory of claim 46, wherein the instructions further cause the one or more processors to design a computing device operative to
in response to a current mobile MM stream-identifying command input identifying the currently selected mobile MM stream, determine whether a memory contains at least one portion of a previously demodulated time slice that corresponds to the currently selected mobile MM stream; and
decode the at least one portion of the previously demodulated time slice prior to decoding the at least one portion of the demodulated current time slice such that the at least one portion of the previously demodulated time slice is reproduced immediately prior to the reproduction of the at least one portion of the demodulated current time slice.

51. A computing device comprising:
means for capturing a current mobile MM signal time slice containing at least one portion of a currently selected mobile MM stream, and means for selectively capturing at least one anticipated mobile MM time slice containing at least one portion of a corresponding anticipated mobile MM stream;
means for demodulating the current mobile MM signal time slice, thereby generating a demodulated current time slice, and means for demodulating the at least one anticipated mobile MM signal time slice, thereby generating at least one demodulated anticipated time slice;
means for identifying at least one portion of the demodulated current time slice that corresponds to the currently selected mobile MM stream, and means for storing the at least one portion of the demodulated current time slice in a memory;
means for identifying at least one portion of the at least one demodulated anticipated time slice that corresponds to the at least one anticipated mobile MM stream, and means for storing the at least one portion of the at least one demodulated anticipated time slice in the memory or in another memory, wherein the at least one portion of the at least one demodulated anticipated time slice represents a final segment of the anticipated mobile MM stream represented in the at least one anticipated mobile MM signal time slice; and
means for obtaining, and adjusting a size of the final segment based on, at least one of: available memory, an available processing speed of a decoder, and an available processing capacity of the decoder.

52. The computing device of claim 51, further comprising means for identifying one or more anticipated mobile MM streams prior to selectively capturing the at least one anticipated mobile MM time slice.

53. The computing device of claim 51, further comprising:
means for prioritizing the one or more anticipated mobile MM streams based on prioritization information, and wherein the selectively capturing the at least one anticipated mobile MM signal time slice comprises selectively capturing the at least one anticipated mobile MM signal time slice based on the prioritization.

54. The computing device of claim 51, further comprising:
means for determining, in response to a current mobile MM stream-identifying command input identifying the currently selected mobile MM stream, whether a memory contains at least one portion of a previously demodulated time slice that corresponds to the currently selected mobile MM stream; and means for decoding the at least one portion of the previously demodulated time slice prior to decoding the at least one portion of the demodulated current time slice such that the at least one portion of the previously demodulated time slice is reproduced immediately prior to the reproduction of the at least one portion of the demodulated current time slice.

* * * * *